(12) United States Patent
Kito et al.

(10) Patent No.: US 10,197,899 B2
(45) Date of Patent: Feb. 5, 2019

(54) DISCHARGE LAMP DRIVER, LIGHT SOURCE, PROJECTOR, AND METHOD OF DRIVING DISCHARGE LAMP

(71) Applicant: SEIKO EPSON CORPORATION, Tokyo (JP)

(72) Inventors: Satoshi Kito, Chino (JP); Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/799,566

(22) Filed: Oct. 31, 2017

(65) Prior Publication Data

US 2018/0129128 A1 May 10, 2018

(30) Foreign Application Priority Data

Nov. 4, 2016 (JP) ................................. 2016-215974

(51) Int. Cl.
| | |
|---|---|
| *G03B 21/20* | (2006.01) |
| *H05B 41/288* | (2006.01) |
| *H04N 9/31* | (2006.01) |
| *G03B 21/00* | (2006.01) |

(Continued)

(52) U.S. Cl.
CPC ..... *G03B 21/2053* (2013.01); *G03B 21/2026* (2013.01); *H04N 9/3105* (2013.01); *H04N 9/3155* (2013.01); *H05B 41/2883* (2013.01); *H05B 41/2887* (2013.01); *G03B 21/006* (2013.01); *G03B 21/208* (2013.01); *G03B 33/12* (2013.01); *H01J 61/025* (2013.01); *H04N 9/3197* (2013.01)

(58) Field of Classification Search
None
See application file for complete search history.

(56) References Cited

U.S. PATENT DOCUMENTS

| | | |
|---|---|---|
| 6,927,539 B2 | 8/2005 | Arimoto et al. |
| 7,667,413 B2 | 2/2010 | Ikeda et al. |
| 8,513,893 B2 | 8/2013 | Ono et al. |

(Continued)

FOREIGN PATENT DOCUMENTS

| | | |
|---|---|---|
| JP | 2004-172086 A | 6/2004 |
| JP | 2011-124184 A | 6/2011 |

(Continued)

*Primary Examiner* — Crystal L Hammond
(74) *Attorney, Agent, or Firm* — Oliff PLC

(57) ABSTRACT

A discharge lamp driver includes a discharge lamp drive unit, a control unit, and a voltage detection part. When an inter-electrode voltage is smaller than a first predetermined value, the control unit controls the discharge lamp drive unit to provide a mixed period in which a first period and a second period are alternately repeated and a third period alternately including a first direct-current period and a second direct-current period. A length of the first direct-current period is larger than a length of the second direct-current period. The length of the second direct-current period is smaller than 0.5 ms. A total of the lengths of the first direct-current periods in the third period is larger than a length of the second period. When the inter-electrode voltage is smaller than the first predetermined value, the control unit is configured to increase the length of the third period in a stepwise manner.

15 Claims, 15 Drawing Sheets

(51) Int. Cl.
*G03B 33/12* (2006.01)
*H01J 61/02* (2006.01)

(56) References Cited

U.S. PATENT DOCUMENTS

| | | | | |
|---|---|---|---|---|
| 8,907,571 B2* | 12/2014 | Yang | H05B 33/0827 | 315/149 |
| 8,911,095 B2 | 12/2014 | Kimura | | |
| 9,192,034 B2* | 11/2015 | Nakamura | H05B 41/2882 | |
| 2004/0090184 A1 | 5/2004 | Krimoto et al. | | |
| 2007/0188113 A1* | 8/2007 | Okamoto | H05B 41/2882 | 315/291 |
| 2008/0315782 A1* | 12/2008 | Hirao | H05B 41/2886 | 315/224 |
| 2009/0115974 A1 | 5/2009 | Ikeda et al. | | |
| 2009/0121640 A1* | 5/2009 | Ootsuka | H05B 41/2925 | 315/129 |
| 2009/0231553 A1* | 9/2009 | Tanaka | H05B 41/2886 | 353/85 |
| 2009/0231554 A1* | 9/2009 | Soma | H05B 41/2886 | 353/85 |
| 2009/0237009 A1* | 9/2009 | Okawa | H05B 41/2928 | 315/307 |
| 2009/0237623 A1* | 9/2009 | Yamauchi | H05B 41/2886 | 353/85 |
| 2009/0237624 A1* | 9/2009 | Soma | H05B 41/2928 | 353/85 |
| 2009/0237625 A1* | 9/2009 | Yamauchi | H05B 41/2928 | 353/85 |
| 2010/0084987 A1* | 4/2010 | Yamauchi | H05B 41/2928 | 315/224 |
| 2010/0103388 A1* | 4/2010 | Yamauchi | H05B 41/2885 | 353/85 |
| 2010/0165305 A1* | 7/2010 | Takezawa | H05B 41/2887 | 353/85 |
| 2010/0201281 A1* | 8/2010 | Terashima | H05B 41/38 | 315/246 |
| 2010/0277085 A1* | 11/2010 | Okawa | H02M 1/4225 | 315/209 R |
| 2011/0089848 A1* | 4/2011 | Ohsawa | H05B 41/2887 | 315/246 |
| 2012/0043904 A1* | 2/2012 | Terashima | H05B 41/2928 | 315/224 |
| 2012/0074858 A1 | 3/2012 | Ono et al. | | |
| 2012/0176585 A1 | 7/2012 | Kimura | | |
| 2014/0036240 A1* | 2/2014 | Samejima | H05B 41/36 | 353/85 |
| 2015/0264786 A1* | 9/2015 | Suzuki | G03B 21/005 | 348/759 |
| 2015/0264787 A1* | 9/2015 | Suzuki | G03B 21/005 | 348/759 |
| 2016/0320693 A1 | 11/2016 | Sato et al. | | |
| 2016/0360600 A1* | 12/2016 | Sato | G03B 21/006 | |
| 2017/0227840 A1* | 8/2017 | Terashima | G03B 21/006 | |
| 2018/0035522 A1* | 2/2018 | Kono | H05B 41/2887 | |

FOREIGN PATENT DOCUMENTS

| | | |
|---|---|---|
| JP | 2012-146442 A | 8/2012 |
| JP | 2016-213011 A | 12/2016 |
| JP | 2017-004591 A | 1/2017 |
| WO | 2007/010781 A1 | 1/2007 |

* cited by examiner

DISCHARGE LAMP DRIVER, LIGHT SOURCE, PROJECTOR, AND METHOD OF DRIVING DISCHARGE LAMP

BACKGROUND

1. Technical Field

The present invention relates to a discharge lamp driver, a light source, a projector, and a method of driving the discharge lamp.

2. Related Art

For example, Patent Document 1 (JP-A-2011-124184) discloses a configuration that switches a frequency of an alternating current supplied to a high-pressure discharge lamp between a first frequency and a second frequency larger than the first frequency and supplies the alternating current at the first frequency in a length of a half cycle to the high-pressure discharge lamp.

However, in the above-described configuration, in the initial state of the lamp (discharge lamp) with relatively little deterioration, protrusions of electrodes grow during execution of driving and the distance between electrodes may be too small. In this case, the lamp voltage becomes excessively low and, in order to supply desired drive power to the discharge lamp, it may be necessary to supply a larger drive current than the limit current value to the lamp. Thereby, it may be impossible to obtain the desired drive power as a result and lamp brightness may be low. When the distance between electrodes is too small, mercury enclosed in the lamp adheres to the electrodes and a mercury bridge that causes short circuit of the opposed electrodes may be produced. When the mercury bridge is produced in the lamp, the lamp is not lighted even when the power is turned on and remains in an unlit state.

SUMMARY

An advantage of some aspects of the invention is to provide a discharge lamp driver that may suppress excessive reduction of a distance between electrodes of a discharge lamp, a light source including the discharge lamp driver, and a projector including the light source. Another advantage of some aspects of the invention is to provide a method of driving the discharge lamp that may suppress excessive reduction of a distance between electrodes of the discharge lamp.

A discharge lamp driver according to an aspect of the invention includes a discharge lamp drive unit configured to supply a drive current to a discharge lamp having a first electrode and a second electrode, a control unit configured to control the discharge lamp drive unit, and a voltage detection part configured to detect an inter-electrode voltage of the discharge lamp, wherein, when the inter-electrode voltage is smaller than a first predetermined value, the control unit is configured to control the discharge lamp drive unit to provide a mixed period in which a first period in which an alternating current is supplied and a second period in which a direct current is supplied are alternately repeated and a third period alternately including a first direct-current period in which a direct current is supplied and a second direct-current period in which a direct current having opposite polarity to polarity of the direct current supplied in the first direct-current period is supplied, the third period in which a length of the first direct-current period is larger than a length of the second direct-current period, the length of the second direct-current period is smaller than 0.5 ms, a total of the lengths of the first direct-current periods in the third period is larger than a length of the second period, and, when the voltage is smaller than the first predetermined value, the control unit configured to increase the length of the third period in a stepwise manner.

According to the discharge lamp driver of the aspect of the invention, when the inter-electrode voltage is smaller than the first predetermined value, the third period is provided in addition to the mixed period in which the first period with the alternating current supplied to the discharge lamp and the second period with the direct current supplied to the discharge lamp are alternately repeated. In the third period, the first direct-current period and the second direct-current period are provided. The length of the first direct-current period is larger than the length of the second direct-current period, and the length of the second direct-current period is smaller than 0.5 ms (milliseconds). Accordingly, in the third period, the electrode on the side as an anode may be heated in the first direct-current period.

Further, the total length of the first direct-current periods is larger than the length of the second period. Accordingly, thermal load applied to the electrode heated in the third period is larger than thermal load applied to the electrode heated in the second period.

As described above, in the third period, compared to the first period or second period, the thermal load applied to the electrode is larger. Accordingly, when a protrusion of the electrode grows, the distance between electrodes becomes smaller, and the inter-electrode voltage becomes lower, the degree of melting of the protrusion of the electrode may be raised by the third period. Thereby, the protrusion may be melted and excessive reduction of the distance between electrodes of the discharge lamp may be suppressed. Therefore, in the initial state of the discharge lamp with relatively little deterioration, reduction of brightness of the discharge lamp may be suppressed and production of a mercury bridge may be suppressed.

For example, the electrode of the discharge lamp may vary and, even when the same thermal load is applied thereto, the degree of growth of the protrusion of the electrode may vary with respect to each discharge lamp. Thereby, for example, when the length of the third period is fixed, it may be impossible to sufficiently melt the protrusion in the third period depending on the discharge lamp. Therefore, it may be impossible to sufficiently suppress the reduction of the distance between electrodes and the condition that the inter-electrode voltage is smaller than the first predetermined value may be maintained. In this case, the inter-electrode voltage maintained in the initial state of the discharge lamp may vary depending on the discharge lamp. When the inter-electrode voltage varies, a problem that brightness of a projector on which the discharge lamp is mounted varies arises.

On the other hand, according to the discharge lamp driver of the aspect of the invention, when the inter-electrode voltage is smaller than the first predetermined value, the control unit increases the length of the third period in the stepwise manner. Accordingly, when the inter-electrode voltage is smaller than the first predetermined value, the thermal load applied to the electrode by the third period until the inter-electrode voltage becomes equal to or larger than the first predetermined value may be made larger. Thereby, even when the discharge lamp varies, appropriate thermal load may be applied with respect to each discharge lamp by the third period, and the inter-electrode voltage may be maintained at the first predetermined value.

The control unit may control the discharge lamp drive unit not to provide the third period when the inter-electrode voltage is equal to or larger than the first predetermined value.

According to this configuration, when the inter-electrode voltage is equal to or larger than the first predetermined value, preferable reduction of the thermal load applied to the electrode may be easier. Therefore, when the initial inter-electrode voltage of the discharge lamp is equal to or larger than the first predetermined value, the rise of the inter-electrode voltage from the initial state may be suppressed and the inter-electrode voltage may be maintained at the first predetermined value.

The control unit may control the discharge lamp drive unit to provide the mixed period and the third period when the inter-electrode voltage is equal to or larger than the first predetermined value, the length of the third period when the inter-electrode voltage is equal to or larger than the first predetermined value may be a first length, the control unit may increase the length of the third period from the first length in a stepwise manner when the inter-electrode voltage is smaller than the first predetermined value, and, after increasing the length of the third period when the inter-electrode voltage is smaller than the first predetermined value, when the inter-electrode voltage becomes equal to or larger than the first predetermined value, the control unit may return the length of the third period to the first length.

According to this configuration, the same driving pattern including the mixed period and the third period may be used in both the case where the inter-electrode voltage is equal to or larger than the first predetermined value and the case where the inter-electrode voltage is smaller than the first predetermined value. Accordingly, the control may be simplified.

The control unit may increase the length of the third period in a stepwise manner when the inter-electrode voltage is smaller than the first predetermined value and an accumulated lighting time of the discharge lamp is equal to or smaller than a second predetermined value.

According to this configuration, in the initial state of the discharge lamp in which the distance between electrodes of the discharge lamp is likely to be smaller, excessive reduction of the distance between electrodes may be preferably suppressed.

The control unit may control the discharge lamp drive unit to provide a fourth period in which an alternating current having a second frequency smaller than a first frequency of the alternating current supplied in the first period is supplied to the discharge lamp, a total of the lengths of the first direct-current periods in the third period may be larger than a length of a half cycle of the alternating current having the second frequency, and the voltage detection part may detect the inter-electrode voltage in the fourth period.

According to this configuration, preferable detection of the inter-electrode voltage may be easier.

A plurality of the mixed periods may be provided, the third period and the fourth period may be respectively provided between the mixed periods adjacent to each other and provided immediately after the first period, and when the inter-electrode voltage is smaller than the first predetermined value, the control unit may control the discharge lamp drive unit to provide one of the third period and the fourth period at first predetermined intervals, and control the discharge lamp drive unit to provide the fourth period at second predetermined intervals larger than the first predetermined intervals.

According to this configuration, the change of the length of the third period may be appropriately controlled in response to the change of the inter-electrode voltage.

The control unit may increase the length of the third period in a stepwise manner when the inter-electrode voltage is smaller than the first predetermined value in a steady lighting period in which steady lighting driving is executed.

According to this configuration, the length of the third period may be changed in a stepwise manner under a condition that the drive power is stable and the state of the electrode is stable.

A light source according to an aspect of the invention includes a discharge lamp configured to emit light, and the discharge lamp driver described above.

According to the light source of the aspect of the invention, the above-described discharge lamp driver is provided, and thereby, the excessive reduction of the distance between electrodes of the discharge lamp may be suppressed.

A projector according to an aspect of the invention includes the light source described above, a light modulator configured to modulate the light emitted from the light source according to an image signal, and a projection system configured to project the light modulated by the light modulator.

According to the projector of the aspect of the invention, the above-described discharge lamp driver is provided, and thereby, the excessive reduction of the distance between electrodes of the discharge lamp may be suppressed.

A method of driving a discharge lamp according to an aspect of the invention is a method of driving the discharge lamp for supplying drive current to a discharge lamp and driving the discharge lamp having a first electrode and a second electrode, the method including, detecting an inter-electrode voltage of the discharge lamp, supplying, when the inter-electrode voltage is smaller than a first predetermined value, the drive current containing a mixed period in which a first period in which an alternating current is supplied and a second period in which a direct current is supplied are alternately repeated and a third period alternately including a first direct-current period in which a direct current is supplied and a second direct-current period in which a direct current having opposite polarity to polarity of the direct current supplied in the first direct-current period, the third period in which a length of the first direct-current period is larger than a length of the second direct-current period, the length of the second direct-current period being smaller than 0.5 ms and a total of lengths of the first direct-current periods in the third period being larger than a length of the second period, and increasing, when the inter-electrode voltage is smaller than the first predetermined value, the length of the third period in a stepwise manner.

According to the method of driving the discharge lamp of the aspect of the invention, in the same manner as described above, the excessive reduction of the distance between electrodes of the discharge lamp may be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector according to an embodiment of the invention will be explained with reference to the drawings.

Note that the scope of the invention is not limited to the following embodiments, but may be arbitrarily changed within the scope of the technical idea of the invention. Further, in the following drawings, scales, numerals, etc. in the actual structures may be different from those of the respective structures for clarification of the respective configurations.

First Embodiment

Figure 1:
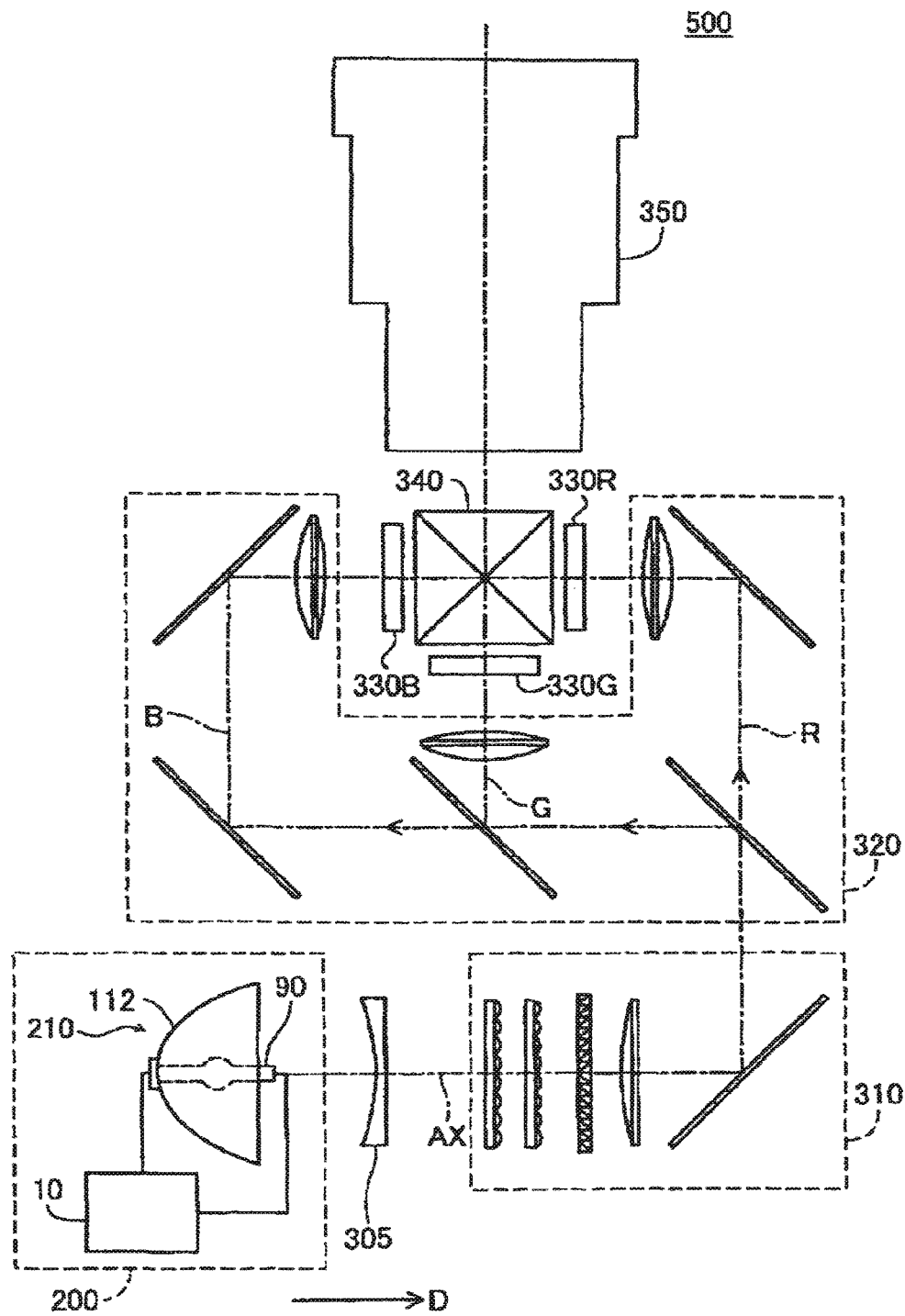
FIG. 1 is a schematic configuration diagram of a projector of the first embodiment.

FIG. 1 is a schematic configuration diagram of a projector 500 of the embodiment. As shown in FIG. 1, the projector 500 of the embodiment includes a light source 200, a parallelizing lens 305, an illumination system 310, a color separation system 320, three liquid crystal light valves (light modulators) 330R, 330G, 330B, a cross dichroic prism 340, and a projection system 350.

The light emitted from the light source 200 passes through the parallelizing lens 305 and enters the illumination system 310. The parallelizing lens 305 parallelizes light from the light source 200.

The illumination system 310 makes adjustment to homogenize illuminance of the lights emitted from the light source 200 on the liquid crystal light valves 330R, 330G, 330B. Further, the illumination system 310 aligns polarization directions of the lights emitted from the light source 200 in one direction. Thereby, the lights emitted from the light source 200 may be effectively used in the liquid crystal light valves 330R, 330G, 330B.

The lights with adjusted illumination distributions and polarization directions enter the color separation system 320. The color separation system 320 separates the incident lights into three color lights of red light (R), green light (G), and blue light (B). The three color lights are respectively modulated by the liquid crystal light valves 330R, 330G, 330B corresponding to the respective colors according to an image signal. The liquid crystal light valves 330R, 330G, 330B include liquid crystal panels 560R, 560G, 560B and polarizers (not shown), which will be described later. The polarizers are provided on the light-incident sides and the light-exiting sides of the respective liquid crystal panels 560R, 560G, 560B.

The modulated three color lights are combined by the cross dichroic prism 340. The combined light enters the projection system 350. The projection system 350 projects the incident light on a screen 700 (see FIG. 3). Thereby, an image is displayed on the screen 700. Note that, as the respective configurations of the parallelizing lens 305, the illumination system 310, the color separation system 320, the cross dichroic prism 340, and the projection system 350, various known configurations may be employed.

Figure 2:
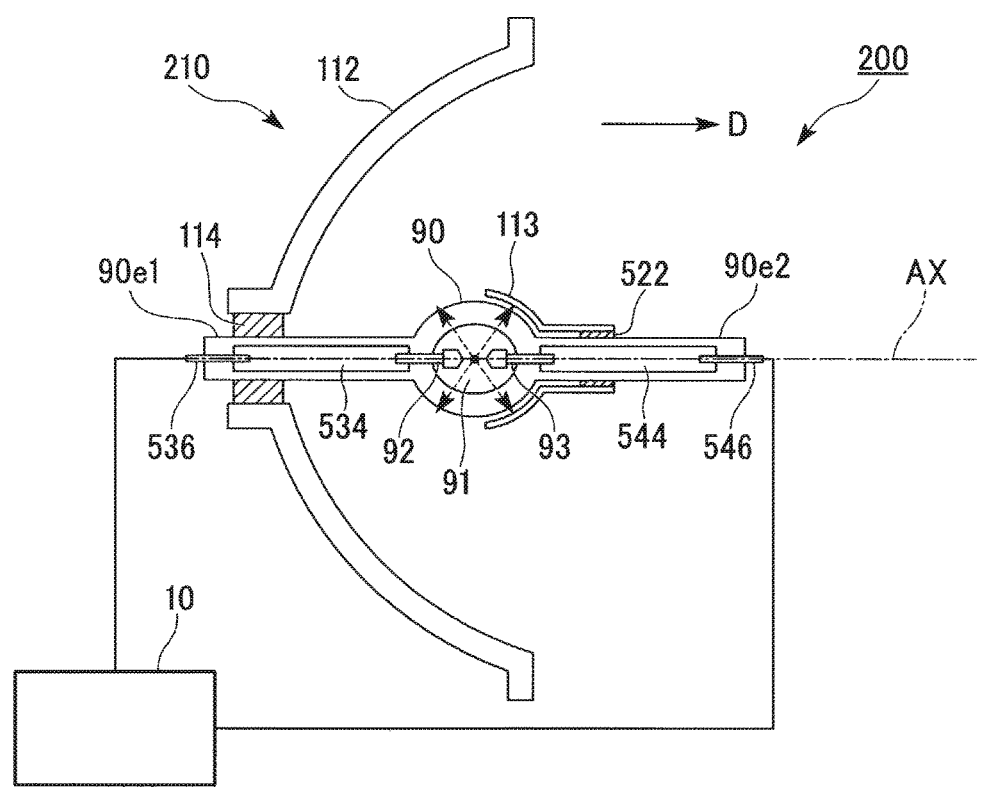
FIG. 2 shows a discharge lamp in the first embodiment.

FIG. 2 is a sectional view showing a configuration of the light source 200. The light source 200 includes a light source unit 210 and a discharge lamp lighter (discharge lamp driver) 10. FIG. 2 shows a sectional view of the light source unit 210. The light source unit 210 includes a main reflector 112, a discharge lamp 90, and a sub-reflector 113.

The discharge lamp lighter 10 supplies a drive current I to the discharge lamp 90 to light the discharge lamp 90. The main reflector 112 reflects the light emitted from the discharge lamp 90 in an irradiation direction D. The irradiation direction D is parallel to an optical axis AX of the discharge lamp 90.

The shape of the discharge lamp 90 is a rod-like shape extending along the irradiation direction D. One end portion of the discharge lamp 90 is referred to as "first end portion 90e1" and the other end portion of the discharge lamp 90 is referred to as "second end portion 90e2". The material of the discharge lamp 90 is a light-transmissive material including quartz glass, for example. The center part of the discharge lamp 90 bulges in a spherical shape, and the inside thereof is a discharge space 91. A gas as a discharge medium including rare gas and metal halide is enclosed in the discharge space 91.

In the discharge space 91, tip ends of a first electrode 92 and a second electrode 93 protrude. The first electrode 92 is provided on the first end portion 90e1 side of the discharge space 91. The second electrode 93 is provided on the second end portion 90e2 side of the discharge space 91. The shapes of the first electrode 92 and the second electrode 93 are rod shapes extending along the optical axis AX. In the discharge space 91, the electrode tip ends of the first electrode 92 and the second electrode 93 are provided to be opposed apart at a predetermined distance. The material of the first electrode 92 and the second electrode 93 is a metal including tungsten, for example.

A first terminal 536 is provided in the first end portion 90e1 of the discharge lamp 90. The first terminal 536 and the first electrode 92 are electrically connected by a conducting member 534 penetrating inside of the discharge lamp 90. Similarly, a second terminal 546 is provided in the second end portion 90e2 of the discharge lamp 90. The second terminal 546 and the second electrode 93 are electrically connected by a conducting member 544 penetrating inside of the discharge lamp 90. The material of the first terminal 536 and the second terminal 546 is a metal including tungsten, for example. As the material of the conducting members 534, 544, for example, a molybdenum foil is used.

The first terminal 536 and the second terminal 546 are connected to the discharge lamp lighter 10. The discharge lamp lighter 10 supplies the drive current I for driving the discharge lamp 90 to the first terminal 536 and the second terminal 546. As a result, arc discharge occurs between the first electrode 92 and the second electrode 93. The lights generated by the arc discharge (discharge lights) radiate from the discharge position in all directions as shown by dashed arrows.

The main reflector 112 is fixed to the first end portion 90e1 of the discharge lamp 90 by a fixing member 114. The main reflector 112 reflects the light traveling toward the opposite side to the irradiation direction D of the discharge lights in the irradiation direction D. The shape of the reflection surface (the surface on the discharge lamp 90 side) of the main reflector 112 is not particularly limited within such a range that the discharge lights may be reflected in the irradiation direction D, but may be e.g. a spheroidal shape or paraboloidal shape. For example, in the case where the shape of the reflection surface of the main reflector 112 is a paraboloidal shape, the main reflector 112 may convert the discharge light into light nearly parallel to the optical axis AX. Thereby, the parallelizing lens 305 may be omitted.

The sub-reflector 113 is fixed to the second end portion 90e2 side of the discharge lamp 90 by a fixing member 522. The shape of the reflection surface (the surface on the discharge lamp 90 side) of the sub-reflector 113 is a spherical shape surrounding the part of the discharge space 91 on the second end portion 90e2 side. The sub-reflector 113 reflects the light traveling toward the opposite side to the side on which the main reflector 112 is provided of the discharge lights toward the main reflector 112. Thereby, the use efficiency of the lights radiated from the discharge space 91 may be improved.

The material of the fixing members 114, 522 is not particularly limited in a range as a heat-resistant material that can resist heat generated from the discharge lamp 90, but may be e.g. an inorganic adhesive. As the method of fixing the arrangement of the main reflector 112, the sub-reflector 113, and the discharge lamp 90, not limited to the method of fixing the main reflector 112 and the sub-reflector 113 to the discharge lamp 90, but any method may be employed. For example, the discharge lamp 90 and the main reflector 112 may be independently fixed to a casing (not shown) of the projector 500. The same applies to the sub-reflector 113.

As below, a circuit configuration of the projector 500 will be explained.

Figure 3:
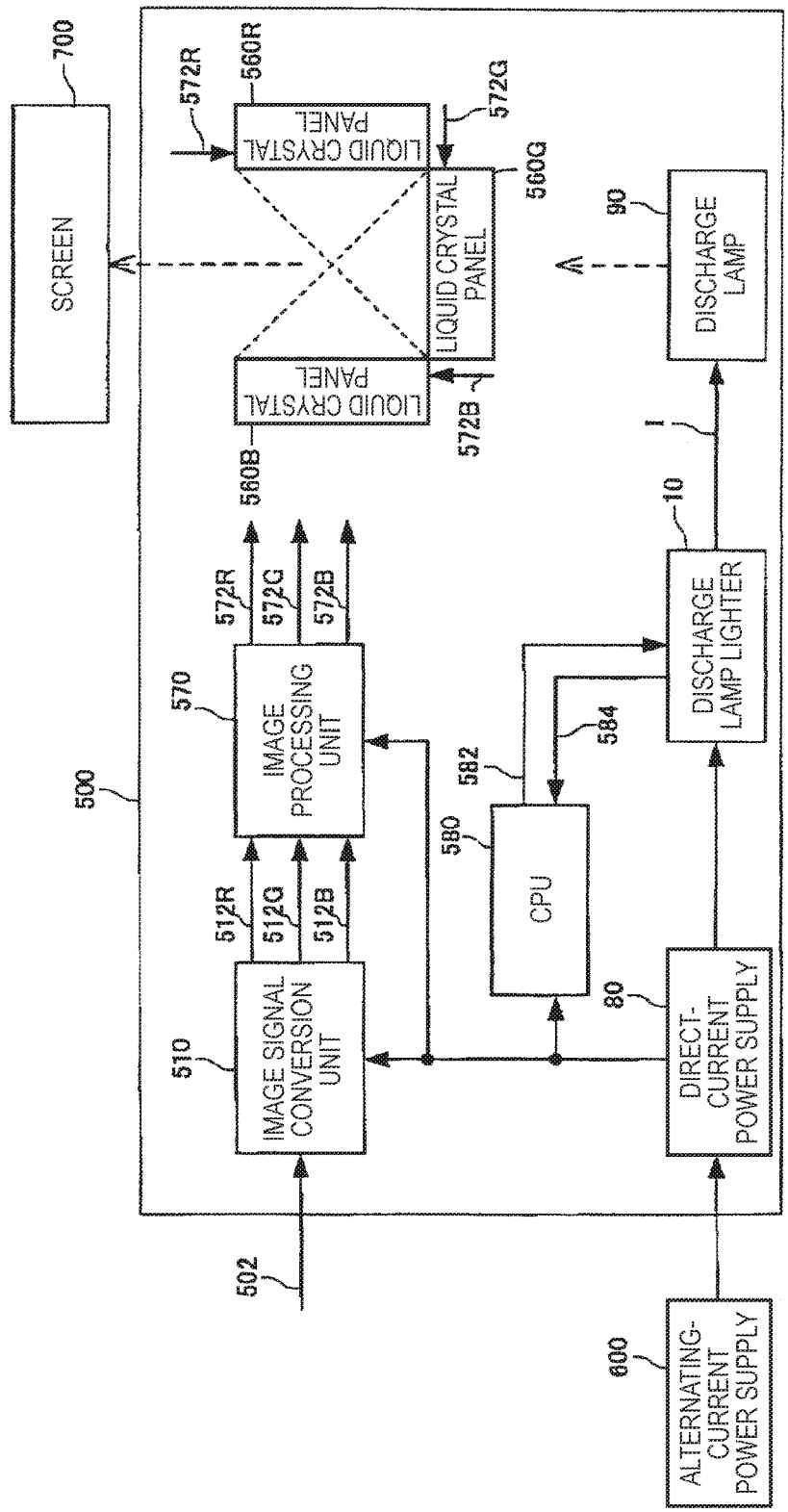
FIG. 3 is a block diagram showing various component elements of the projector of the first embodiment.

FIG. 3 shows an example of the circuit configuration of the projector 500 of the embodiment. The projector 500 includes an image signal conversion unit 510, a direct-current power supply 80, the liquid crystal panels 560R, 560G, 560B, an image processing unit 570, and a CPU (Central Processing Unit) 580 in addition to the optical systems shown in FIG. 1.

The image signal conversion unit 510 converts an image signal 502 (a brightness-color-difference signal, an analog RGB signal, or the like) input from outside into a digital RGB signal having a predetermined word length to generate image signals 512R, 512G, 512B and supplies the signals to the image processing unit 570.

The image processing unit 570 respectively performs image processing on the three image signals 512R, 512G, 512B. The image processing unit 570 supplies drive signals 572R, 572G, 572B for respectively driving the liquid crystal panels 560R, 560G, 560B to the liquid crystal panels 560R, 560G, 560B.

The direct-current power supply 80 converts an alternating-current voltage supplied from an external alternating-current power supply 600 into a constant direct-current voltage. The direct-current power supply 80 supplies the direct-current voltage to the image signal conversion unit 510, the image processing unit 570 on the secondary side of a transformer (not shown, but contained in the direct-current power supply 80) and the discharge lamp lighter 10 on the primary side of the transformer.

The discharge lamp lighter 10 generates a high voltage between the electrodes of the discharge lamp 90 when activated and causes breakdown to form a discharge path. Afterward, the discharge lamp lighter 10 supplies a drive current I for the discharge lamp 90 to maintain discharge.

The liquid crystal panels 560R, 560G, 560B are provided in the above-described liquid crystal light valves 330R, 330G, 330B, respectively. The liquid crystal panels 560R, 560G, 560B modulate transmittance (brightness) of the color lights entering the respective liquid crystal panels 560R, 560G, 560B via the above-described optical systems based on the drive signals 572R, 572G, 572B, respectively.

The CPU 580 controls various operations from start of lighting to extinction of the projector 500. For example, in the example of FIG. 3, a lighting command and an extinction command are output via a communication signal 582 to the discharge lamp lighter 10. The CPU 580 receives lighting information of the discharge lamp 90 via a communication signal 584 from the discharge lamp lighter 10.

As below, a configuration of the discharge lamp lighter 10 will be explained.

Figure 4:
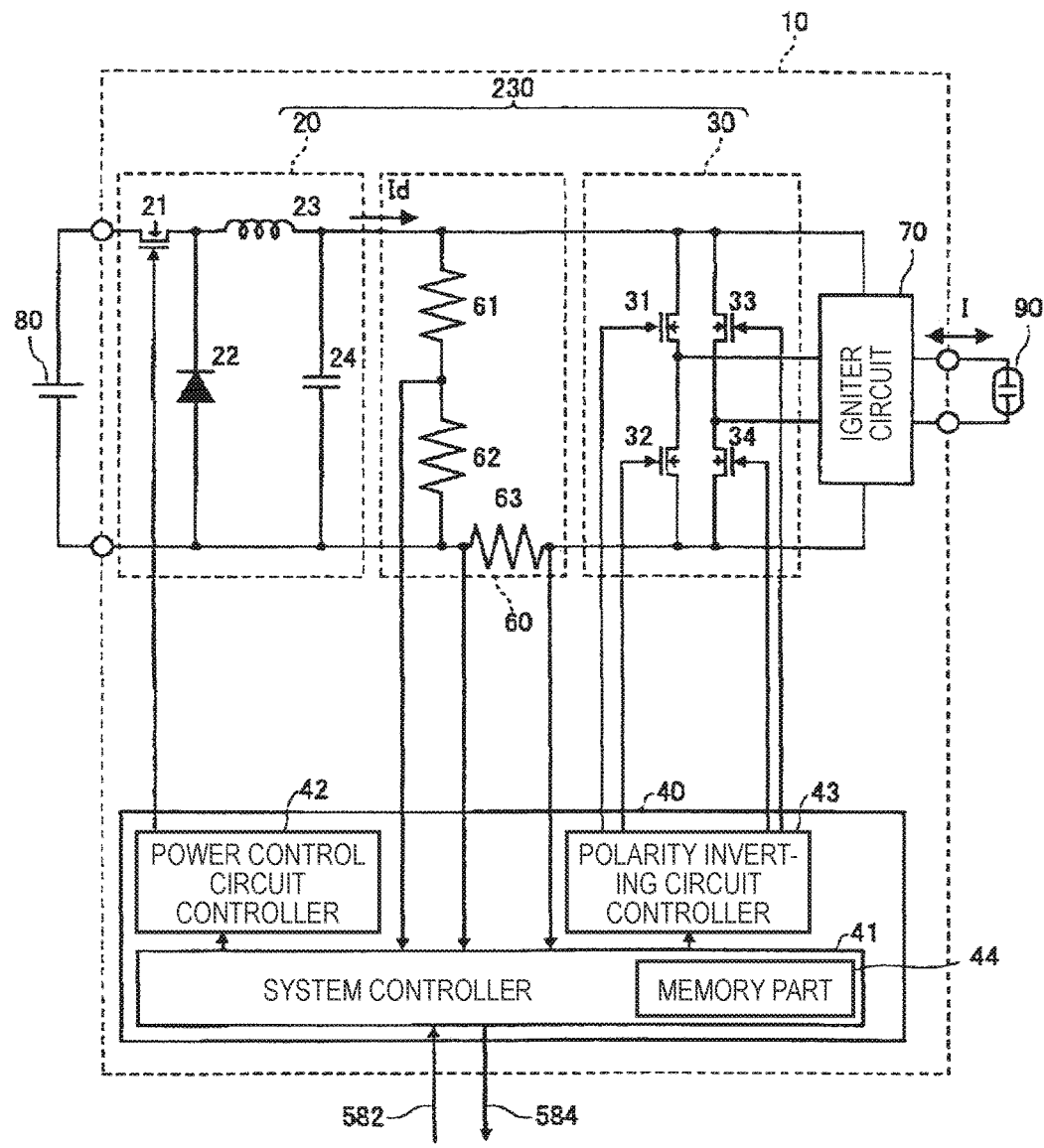
FIG. 4 is a circuit diagram of a discharge lamp lighter of the first embodiment.

FIG. 4 shows an example of a circuit configuration of the discharge lamp lighter 10.

As shown in FIG. 4, the discharge lamp lighter 10 includes a power control circuit 20, a polarity inverting circuit 30, a control unit 40, an operation detection unit 60, and an igniter circuit 70.

The power control circuit 20 generates drive power supplied to the discharge lamp 90. In the embodiment, the power control circuit 20 includes a down chopper circuit, with input of the voltage from the direct-current power supply 80, that drops the input voltage and outputs a direct current Id.

The power control circuit 20 includes a switch element 21, a diode 22, a coil 23, and a capacitor 24. The switch element 21 includes e.g. a transistor. In the embodiment, one end of the switch element 21 is connected to the positive voltage side of the direct-current power supply 80 and the other end is connected to the cathode terminal of the diode 22 and one end of the coil 23.

One end of the capacitor 24 is connected to the other end of the coil 23 and the other end of the capacitor 24 is connected to the anode terminal of the diode 22 and the negative voltage side of the direct-current power supply 80. A current control signal is input to the control terminal of the switch element 21 from the control unit 40 to be described later, and ON/OFF of the switch element 21 is controlled. For the current control signal, e.g., a PWM (Pulse Width Modulation) control signal may be used.

When the switch element 21 is turned ON, a current flows in the coil 23 and energy is accumulated in the coil 23. Then, when the switch element 21 is turned OFF, the energy accumulated in the coil 23 is released in a path passing through the capacitor 24 and the diode 22. As a result, the direct current Id according to the rate of the time when the switch element 21 is ON is generated.

The polarity inverting circuit 30 inverts the polarity of the direct current Id input from the power control circuit 20 at predetermined times. Thereby, the polarity inverting circuit 30 generates and outputs a drive current I as a direct current that continues in a controlled time or a drive current I as an alternating current having an arbitrary frequency. In the embodiment, the polarity inverting circuit 30 includes an inverter bridge circuit (full-bridge circuit).

The polarity inverting circuit 30 includes e.g. a first switch element 31, a second switch element 32, a third switch element 33, and a fourth switch element 34 including transistors. The polarity inverting circuit 30 has a configuration in which the series-connected first switch element 31 and second switch element 32 and the series-connected third switch element 33 and fourth switch element 34 are parallel-connected to each other. Polarity inversion control signals are respectively input from the control unit 40 to the control terminals of the first switch element 31, the second switch element 32, the third switch element 33, and the fourth switch element 34. ON/OFF operations of the first switch element 31, the second switch element 32, the third switch element 33, and the fourth switch element 34 are controlled based on the polarity inversion control signals.

In the polarity inverting circuit 30, the operation of alternately turning ON/OFF of the first switch element 31 and fourth switch element 34 and the second switch element 32 and third switch element 33 is repeated. Thereby, the polarity of the direct current Id output from the power control circuit 20 is alternately inverted. The polarity inverting circuit 30 generates and outputs the drive current I as a direct current that continues the same polarity state in a controlled time or the drive current I as an alternating current having a controlled frequency from a common connection point between the first switch element 31 and the second switch element 32 and a common connection point between the third switch element 33 and the fourth switch element 34.

That is, the polarity inverting circuit 30 is controlled so that, when the first switch element 31 and the fourth switch element 34 are ON, the second switch element 32 and the third switch element 33 may be OFF and, when the first switch element 31 and the fourth switch element 34 are OFF, the second switch element 32 and the third switch element 33 may be ON. Therefore, when the first switch element 31 and the fourth switch element 34 are ON, the drive current I flowing from one end of the capacitor 24 sequentially through the first switch element 31, the discharge lamp 90, and the fourth switch element 34 is generated. When the second switch element 32 and the third switch element 33 are ON, the drive current I flowing from one end of the capacitor 24 sequentially through the third switch element 33, the discharge lamp 90, and the second switch element 32 is generated.

In the embodiment, the part combining the power control circuit 20 and the polarity inverting circuit 30 corresponds to a discharge lamp drive unit 230. That is, the discharge lamp drive unit 230 supplies the drive current I for driving the discharge lamp 90 to the discharge lamp 90.

The control unit 40 controls the discharge lamp drive unit 230. In the example of FIG. 4, the control unit 40 controls the power control circuit 20 and the polarity inverting circuit 30, and thereby, controls parameters including the retention time in which the drive current I continues the same polarity, the current value of the drive current I (the power value of the drive power), and the frequency. The control unit 40 performs polarity inversion control of controlling the retention time in which the drive current I continues the same polarity, the frequency of the drive current I, etc. on the polarity inverting circuit 30 according to the polarity inversion timing of the drive current I. The control unit 40 performs current control of controlling the current value of the output direct current Id on the power control circuit 20.

In the embodiment, the control unit 40 can execute alternating-current driving, direct-current driving, biased driving, low-frequency alternating-current driving, and mixed driving. The alternating-current driving is driving with an alternating current supplied to the discharge lamp 90. The direct-current driving is driving with a direct current supplied to the discharge lamp 90.

The biased driving is driving with direct currents different in polarity alternately supplied to the discharge lamp 90, in which the length of the direct current with one polarity is sufficiently longer than the length of the direct current with the other polarity. The low-frequency alternating-current driving is driving with an alternating current at a lower frequency than that of the alternating current of the alternating-current driving supplied to the discharge lamp 90. The mixed driving is driving in which the alternating-current driving and the direct-current driving are alternately executed. The drive current waveforms of the drive current I supplied to the discharge lamp 90 by the respective discharge lamp drivings will be described later in detail.

The configuration of the control unit 40 is not particularly limited. In the embodiment, the control unit 40 includes a system controller 41, a power control circuit controller 42, and a polarity inverting circuit controller 43. Note that a part or whole of the control unit 40 may be formed by a semiconductor integrated circuit.

The system controller 41 controls the power control circuit controller 42 and the polarity inverting circuit controller 43, and thereby, controls the power control circuit 20 and the polarity inverting circuit 30. The system controller 41 may control the power control circuit controller 42 and the polarity inverting circuit controller 43 based on a lamp voltage (inter-electrode voltage) Vla and the drive current I detected by the operation detection unit 60.

In the embodiment, a memory part 44 is connected to the system controller 41.

The system controller 41 may control the power control circuit 20 and the polarity inverting circuit 30 based on information stored in the memory part 44. In the memory part 44, for example, information on drive parameters of the retention time in which the drive current I continues the same polarity, the current value, frequency, waveform, and modulation pattern of the drive current I, etc. may be stored.

The power control circuit controller 42 outputs a current control signal to the power control circuit 20 based on a control signal from the system controller 41, and thereby, controls the power control circuit 20.

The polarity inverting circuit controller 43 outputs the polarity inversion control signal to the polarity inverting circuit 30 based on the control signal from the system controller 41, and thereby, controls the polarity inverting circuit 30.

The control unit 40 may be realized using a dedicated circuit to perform the above-described control and various kinds of control of the processing to be described later. On the other hand, the control unit 40 may function as a computer by the CPU executing a control program stored in the memory part 44, for example, to perform various kinds of control of the processing.

Figure 5:
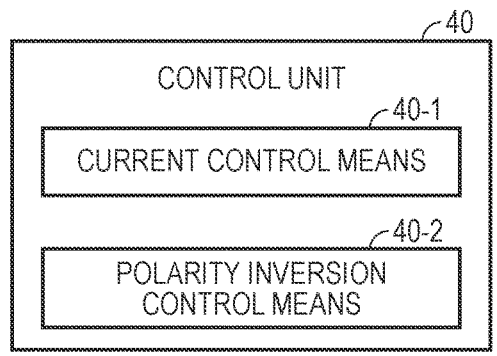
FIG. 5 is a block diagram showing one configuration example of a control unit of the first embodiment.

FIG. 5 is a diagram for explanation of another configuration example of the control unit 40. As shown in FIG. 5, the control unit 40 may be adapted to function as a current control unit 40-1 that controls the power control circuit 20 and a polarity inversion control unit 40-2 that controls the polarity inverting circuit 30 by the control program.

In the example shown in FIG. 4, the control unit 40 is formed as a part of the discharge lamp lighter 10. On the other hand, the CPU 580 may be adapted to serve a part of the function of the control unit 40.

In the embodiment, the operation detection unit 60 includes a voltage detection part that detects the lamp voltage Vla of the discharge lamp 90 and outputs lamp voltage information to the control unit 40. Further, the operation detection unit 60 may include a current detection part that detects the drive current I and outputs drive current information to the control unit 40, etc. In the embodiment, the operation detection unit 60 includes a first resistor 61, a second resistor 62, and a third resistor 63.

In the embodiment, the voltage detection part of the operation detection unit 60 detects the lamp voltage Vla using the voltage divided by the first resistor 61 and the second resistor 62 series-connected to each other in parallel to the discharge lamp 90. Further, in the embodiment, the current detection part detects the drive current I using the voltage generated in the third resistor 63 series-connected to the discharge lamp 90.

The igniter circuit 70 operates only when the lighting of the discharge lamp 90 is started. The igniter circuit 70 supplies a high voltage (a voltage higher than that when the discharge lamp 90 is normally lighted) necessary for breakdown between the electrodes (between the first electrode 92 and the second electrode 93) of the discharge lamp 90 at the start of lighting of the discharge lamp 90 to form a discharge path to between the electrodes (between the first electrode 92 and the second electrode 93) of the discharge lamp 90. In the embodiment, the igniter circuit 70 is parallel-connected to the discharge lamp 90.

Figure 6A:
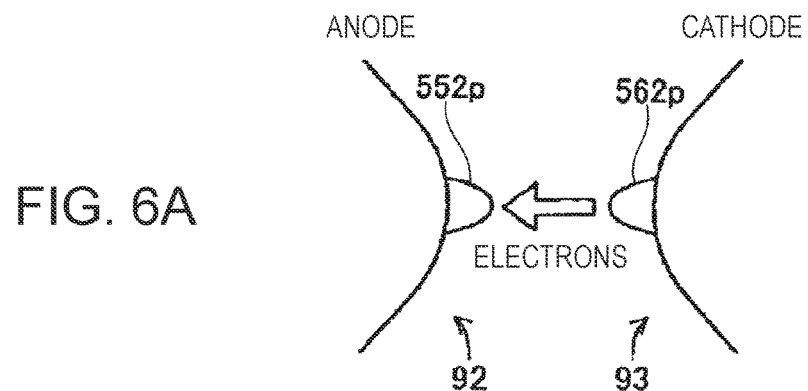
FIG. 6A shows a state of protrusions on ends of electrodes of the discharge lamp.
Figure 6B:
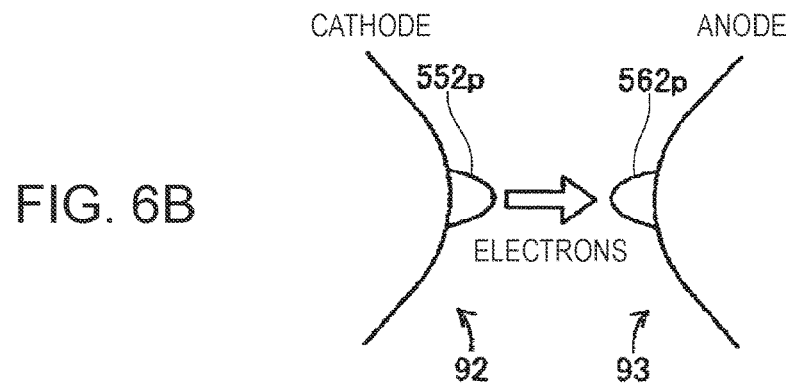
FIG. 6B shows a state of the protrusions on the ends of electrodes of the discharge lamp.

FIGS. 6A and 6B show end portions of the first electrode 92 and the second electrode 93. Protrusions 552p, 562p are formed on the ends of the first electrode 92 and the second electrode 93, respectively.

Discharge generated between the first electrode 92 and the second electrode 93 is mainly generated between the protrusion 552p and the protrusion 562p. In the case with the protrusions 552p, 562p like the embodiment, compared to the case without protrusions, shifts of the discharge position (arc position) in the first electrode 92 and the second electrode 93 may be suppressed.

FIG. 6A shows a first polarity state in which the first electrode 92 operates as an anode and the second electrode 93 operates as a cathode. In the first polarity state, electrons move from the second electrode 93 (cathode) to the first electrode 92 (anode) by discharge. The electrons are emitted from the cathode (second electrode 93). The electrons emitted from the cathode (second electrode 93) collide with the tip end of the anode (first electrode 92). Heat is generated by the collision and the temperature of the tip end (protrusion 552p) of the anode (first electrode 92) rises.

FIG. 6B shows a second polarity state in which the first electrode 92 operates as a cathode and the second electrode 93 operates as an anode. In the second polarity state, electrons move from the first electrode 92 to the second electrode 93 reversely to the first polarity state. As a result, the temperature of the tip end (protrusion 562p) of the second electrode 93 rises.

As described above, the drive current I is supplied to the discharge lamp 90, and thereby, the temperature of the anode with which the electrons collide rises. On the other hand, the temperature of the cathode emitting electrons falls while emitting electrons toward the anode.

The distance between electrodes between the first electrode 92 and the second electrode 93 increases with deterioration of the protrusions 552p, 562p. This is because the protrusions 552p, 562p are worn. When the distance between electrodes increases, the resistance between the first electrode 92 and the second electrode 93 increases and the lamp voltage Vla increases. Therefore, the change of the distance between electrodes, i.e., the degree of deterioration of the discharge lamp 90 may be detected with reference to the lamp voltage Vla.

Note that the first electrode 92 and the second electrode 93 have the same configuration, and only the first electrode 92 may be representatively explained in the following description. Further, the protrusion 552p on the tip end of the first electrode 92 and the protrusion 562p on the tip end of the second electrode 93 have the same configuration, and only the protrusion 552p may be representatively explained in the following description.

As below, control of the discharge lamp drive unit 230 by the control unit 40 of the embodiment will be explained. In the embodiment, the control unit 40 controls the discharge lamp drive unit 230 in combination of the four drivings of alternating-current driving, direct-current driving, biased driving, and low-frequency alternating-current driving. In the embodiment, the control unit 40 controls the discharge lamp drive unit 230 so that a predetermined driving cycle may be repeated, for example. The predetermined driving cycle includes a driving cycle C2 and a driving cycle C1. In the embodiment, the driving cycle C2 and the driving cycle C1 are switched according to the lamp voltage Vla.

Figure 7:
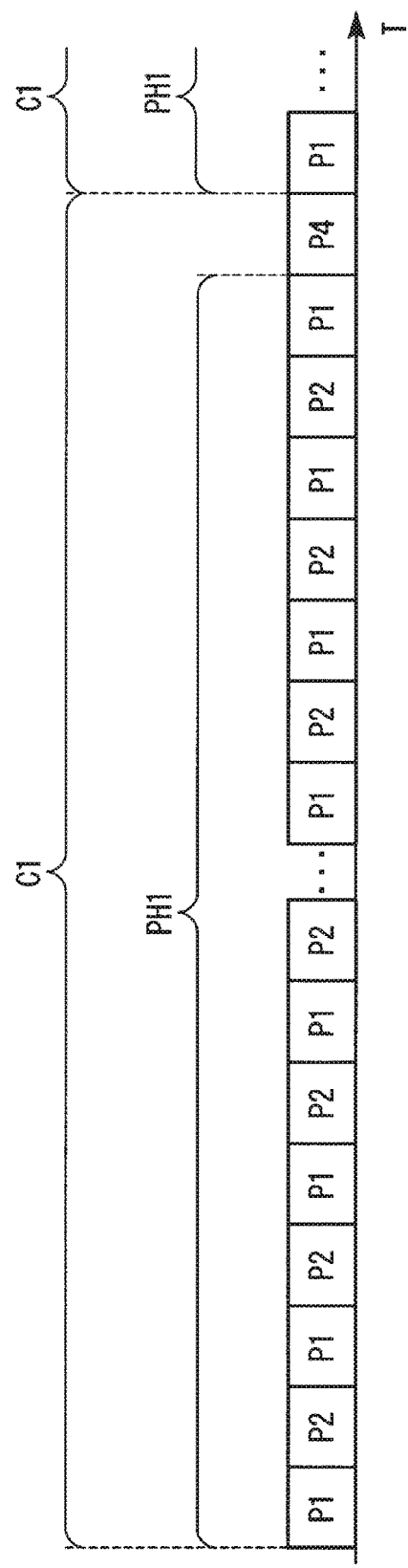
FIG. 7 is a schematic diagram showing an example of changes of periods in which drive currents are supplied to the discharge lamp in the first embodiment.

As below, changes of periods in which the drive current I is supplied to the discharge lamp 90 in the respective driving cycles will be explained. First, the driving cycle C1 will be explained. In the embodiment, the driving cycle C1 is a driving cycle executed when the lamp voltage Vla is equal to or larger than a first predetermined value Vla1. The first predetermined value Vla1 is e.g. from 60 V to 63 V. FIG. 7 shows the case where the discharge lamp drive unit 230 is controlled so that the driving cycle C1 may be repeated.

As shown in FIG. 7, in the embodiment, the driving cycle C1 has first periods P1, second periods P2, and a fourth period P4. In the driving cycle C1, a mixed period PH1 in which the first period P1 and the second period P2 are alternately repeated is provided. That is, the control unit 40 controls the discharge lamp drive unit 230 so that the mixed period PH1 and the fourth period P4 are provided in the driving cycle C1.

In the example of FIG. 7, the driving cycle C1 includes one mixed period PH1 and the fourth period P4 provided immediately after the mixed period PH1. That is, in the embodiment, the control unit 40 controls the discharge lamp drive unit 230 so that a third period P3, which will be described later, is not provided when the lamp voltage Vla is equal to or larger than the first predetermined value Vla1. In the embodiment, the driving cycle C1 is repeated, and thereby, the mixed period PH1 and the fourth period P4 are alternately repeated. The fourth period P4 is provided at second predetermined intervals (e.g. 90 s (seconds), which will be described later. The number of first periods P1 and the number of second periods P2 in the mixed period PH1 are not particularly limited.

The first period P1 is a period in which the alternating-current driving is executed. The second period P2 is a period in which the direct-current driving is executed. The fourth period P4 is a period in which the low-frequency alternating-current driving is executed. As described above, the driving cycle C1 is executed by the control unit 40 performing the three drivings. The mixed period PH1 is a period in which the mixed driving is executed. As below, the respective periods will be explained in detail.

Figure 8:
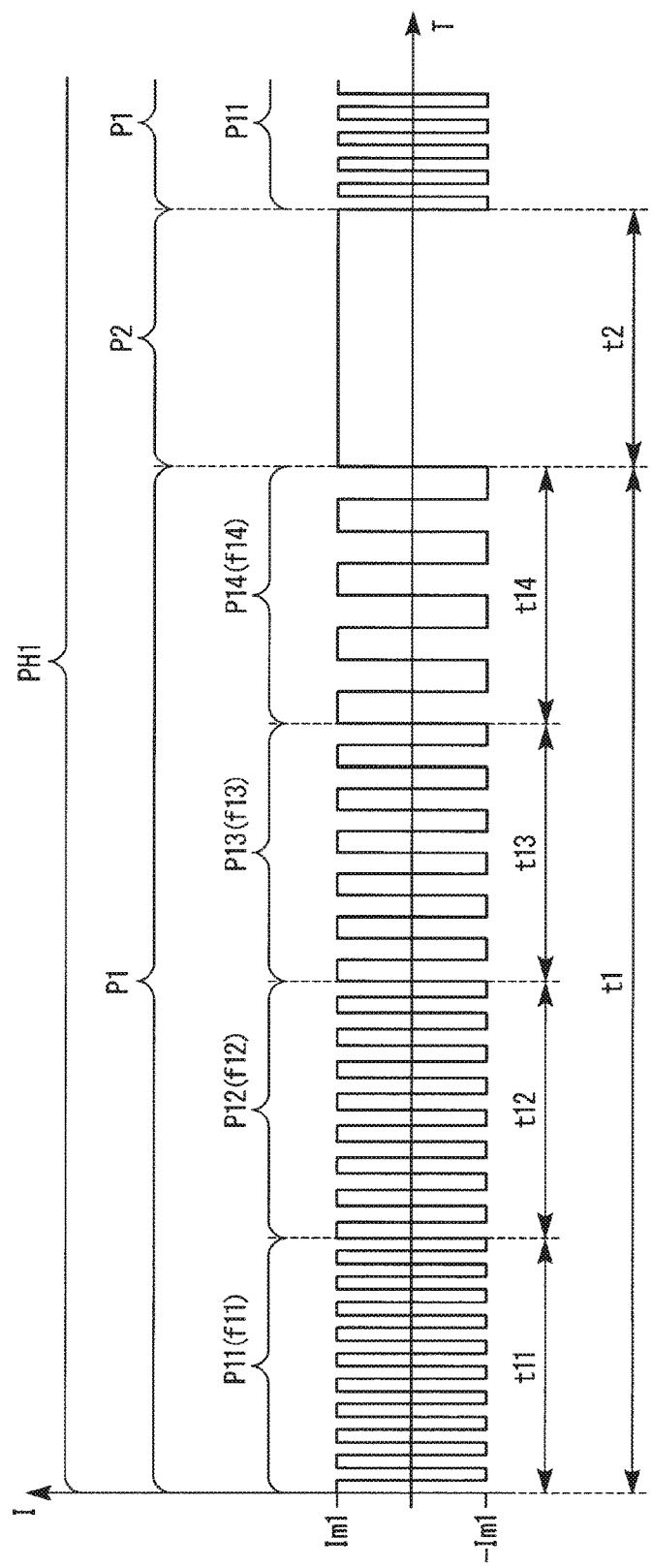
FIG. 8 shows an example of a drive current waveform of a mixed period in the first embodiment.

FIG. 8 shows an example of a drive current waveform in the mixed period PH1. In FIG. 8, the vertical axis indicates the drive current I and the horizontal axis indicates time T. The drive current I is shown as being positive in the first polarity state and negative in the second polarity state.

As shown in FIG. 8, the first period P1 is a period in which an alternating current having a first frequency f1 is supplied to the discharge lamp 90. In the embodiment, the first period P1 has a first alternating-current period P11, a second alternating-current period P12, a third alternating-current period P13, and a fourth alternating-current period P14. The first alternating-current period P11, the second alternating-current period P12, the third alternating-current period P13, and the fourth alternating-current period P14 are continuously provided in this order.

In the embodiment, the alternating currents in the first alternating-current period P11, the second alternating-current period P12, the third alternating-current period P13, and the fourth alternating-current period P14 are e.g. square-wave alternating currents in which polarity is inverted at a plurality of times between a current value Im1 and a current value −Im1.

A first frequency f11 in the first alternating-current period P11, a second frequency f12 in the second alternating-current period P12, a third frequency f13 in the third alternating-current period P13, and a fourth frequency f14 in the fourth alternating-current period P14 are different from one another. That is, in the embodiment, the first frequency f1 includes a plurality of frequencies different from one another and the first period P1 has a plurality of alternating-current periods in which the frequencies of the alternating currents supplied to the discharge lamp 90 are different from one another.

The first frequency f11, the second frequency f12, the third frequency f13, and the fourth frequency f14 are smaller in this order. That is, in the first period P1, the frequency of the alternating current in the alternating-current period provided later is smaller.

In the embodiment, start polarity of the first period P1 is e.g. opposite polarity to end polarity of the period provided immediately before. The start polarity is polarity of the drive current I at the time when a certain period starts. The end polarity is polarity of the drive current I at the time when a certain period ends.

Specifically, for example, when the polarity of the direct current supplied to the discharge lamp 90 in the second period P2 provided immediately before the first period P1 is the second polarity, the end polarity of the second period P2 is the second polarity and the start polarity of the first period P1 is the first polarity. Further, for example, when the end polarity of the fourth period P4 provided immediately before the first period P1 is the first polarity, the start polarity of the first period P1 is the second polarity. In the embodiment, the start polarity of the first period P1 is the start polarity of the first alternating-current period P11.

In the embodiment, a length t11 of the first alternating-current period P11, a length t12 of the second alternating-current period P12, a length t13 of the third alternating-current period P13, and a length t14 of the fourth alternating-current period P14 are e.g. the same. In the embodiment, a length t1 of the first period P1, i.e., the total length of the lengths t11 to t14 is e.g. from 10 ms (milliseconds) to 10 s (seconds). The length t1 of the first period P1 is set as above, and thereby, thermal load may be preferably applied to the protrusion 552p of the first electrode 92 and the protrusion 562p of the second electrode 93.

The second period P2 is a period in which a direct current is supplied to the discharge lamp 90. In the example shown in FIG. 8, in the second period P2, the drive current I with the first polarity having the constant current value Im1 is supplied to the discharge lamp 90. The polarity of the direct current supplied to the discharge lamp 90 in the second period P2 of the mixed period PH1 is inverted at each time when the second period P2 is provided.

That is, in the mixed period PH1 shown in FIG. 7, the direct current of the second period P2 provided immediately before the first period P1 and the direct current of the second period P2 provided immediately after the first period P1 are different in polarity from each other. For example, when the polarity of the direct current of the second period P2 provided immediately before the first period P1 is the same first polarity as the direct current of the second period P2 shown in FIG. 8, the polarity of the direct current of the second period P2 provided immediately after the first period P1 is the second polarity opposite to the first polarity. In this case, in the second period P2 provided immediately after the first period P1, the drive current I with the second polarity having the constant current value −Im1 is supplied to the discharge lamp 90.

A length t2 of the second period P2 shown in FIG. 8 is larger than the length of the half cycle of the alternating current having the first frequency f11 in the first period P1. The length t2 of the second period P2 is e.g. from 10 ms (milliseconds) to 20 ms (milliseconds). The length t2 of the second period P2 is set as above, and thereby, thermal load may be preferably applied to the protrusion 552p of the first electrode 92.

As shown in FIG. 7, in the embodiment, the fourth period P4 is provided between the mixed periods PH1 temporally adjacent to each other. The fourth period P4 is provided immediately after the first period P1, for example. The fourth period P4 is provided immediately before the first period P1, for example. That is, the fourth period P4 is provided between the first periods P1, for example.

Figure 9:
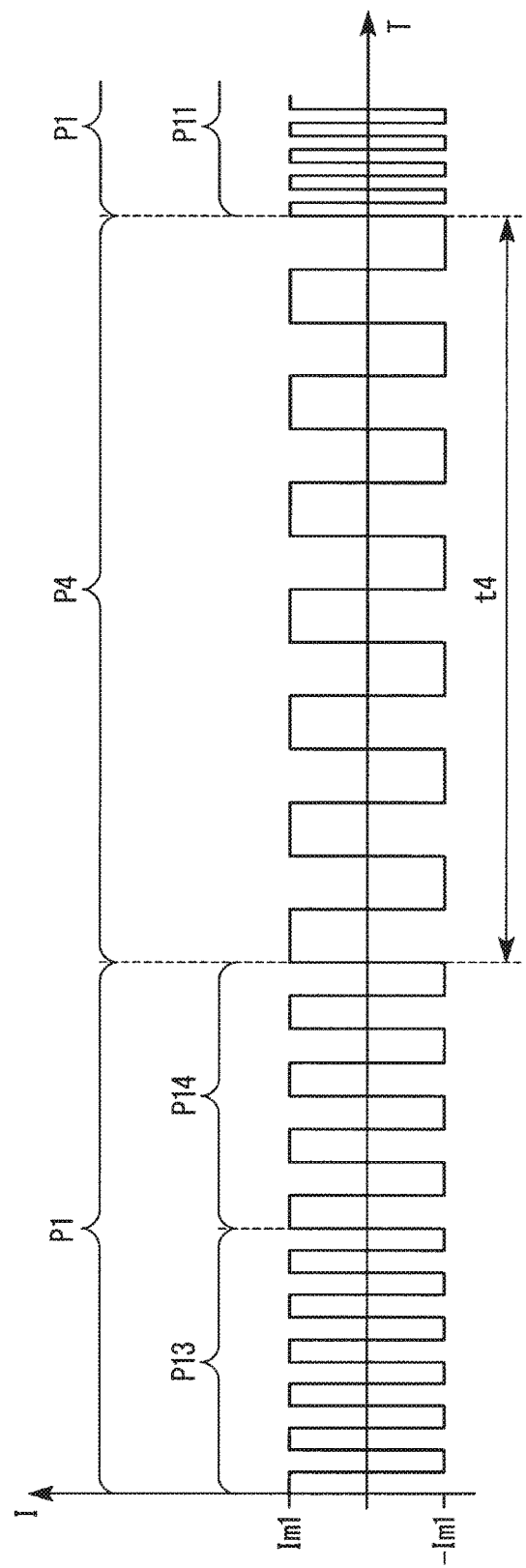
FIG. 9 shows an example of a drive current waveform of a fourth period in the first embodiment.

FIG. 9 shows an example of a drive current waveform of the fourth period P4. In FIG. 9, the vertical axis indicates the drive current I and the horizontal axis indicates time T. The drive current I is shown as being positive in the first polarity state and negative in the second polarity state.

As shown in FIG. 9, the fourth period P4 is a period in which an alternating current having a second frequency f2 smaller than the first frequency f1 supplied to the discharge lamp 90 in the first period P1 is supplied to the discharge lamp 90. That is, the second frequency f2 of the alternating current in the fourth period P4 is smaller than any of the first frequencies f11 to f14. The value of the second frequency f2 is e.g. from 10 Hz to 100 Hz.

The start polarity of the fourth period P4 is inverted at each time when the period is provided. In the example of FIG. 9, the start polarity of the fourth period P4 is e.g. the first polarity. Accordingly, in the fourth period P4 provided next to the fourth period P4 shown in FIG. 9, the start polarity is the second polarity.

A length t4 of the fourth period P4 is larger than the length t2 of the second period P2, for example. The length t4 of the fourth period P4 is from the length of six cycles of the alternating current having the second frequency f2 to the length of the thirty cycles thereof. The length t4 of the fourth period P4 is set as above, and thereby, the protrusion 552*p* of the first electrode 92 may be preferably shaped.

Figure 10:
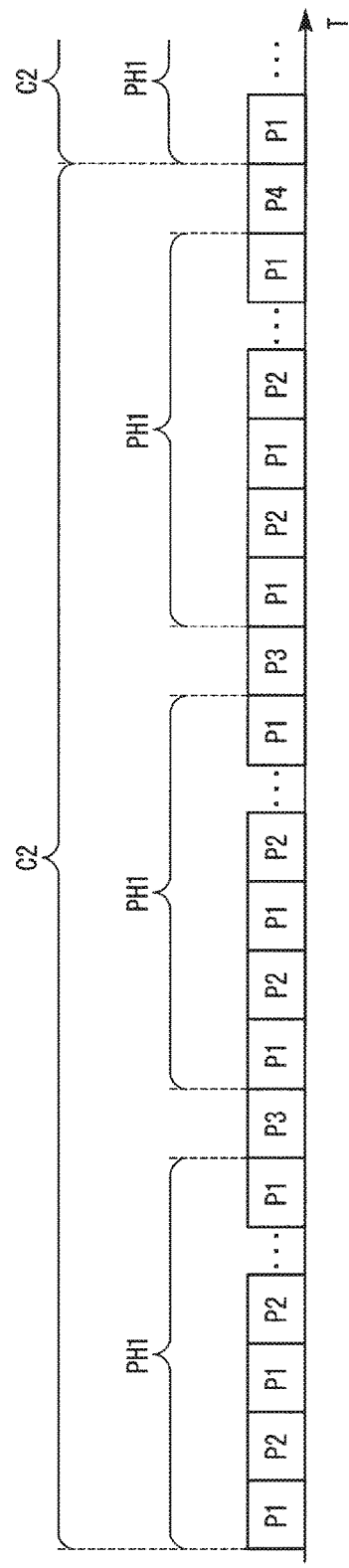
FIG. 10 is a schematic diagram showing an example of changes of periods in which drive currents are supplied to the discharge lamp in the first embodiment.

Next, the driving cycle C2 is explained. In the embodiment, the driving cycle C2 is a driving cycle executed when the lamp voltage Vla is larger than the first predetermined value Vla1. FIG. 10 shows the case where the discharge lamp drive unit 230 is controlled so that the driving cycle C2 may be repeated. As shown in FIG. 10, in the embodiment, the driving cycle C2 has the mixed periods PH1, the third periods P3, and the fourth period P4. That is, the control unit 40 controls the discharge lamp drive unit 230 so that the mixed periods PH1, the third periods P3, and the fourth period P4 may be provided in the driving cycle C2. In the embodiment, a plurality of the mixed periods PH1 are provided in the single driving cycle C2. The driving cycle C2 of the embodiment is different from the driving cycle C1 in that the third periods P3 are provided.

The third period P3 is a period in which the biased driving is executed. The third period P3 is provided between the mixed periods PH1 temporally adjacent to each other. The third period P3 is provided immediately after the first period P1, for example. The third period P3 is provided immediately before the first period P1, for example. That is, the third period P3 is provided between the first periods P1, for example.

Figure 11:
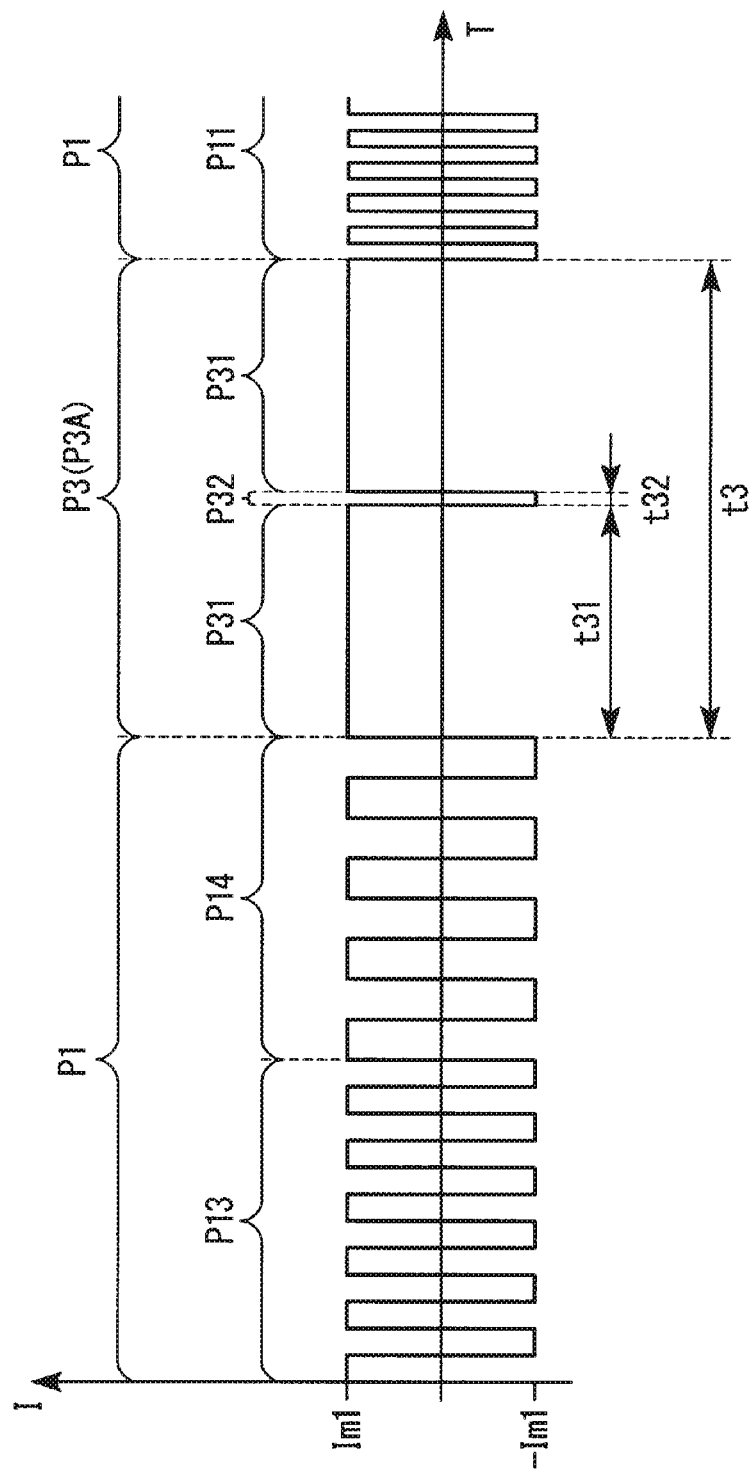
FIG. 11 shows an example of a drive current waveform of a third period in the first embodiment.
Figure 12:
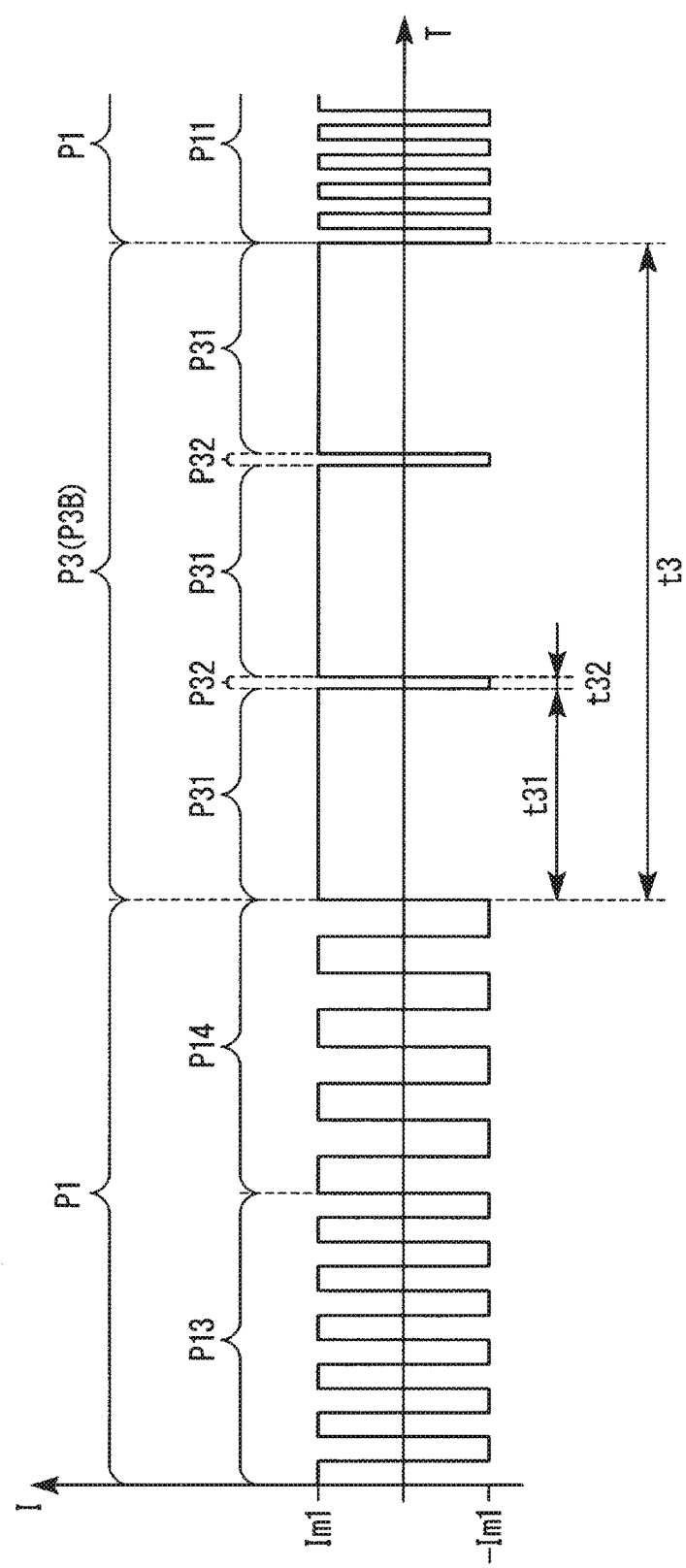
FIG. 12 shows an example of a drive current waveform of a third period in the first embodiment.
Figure 13:
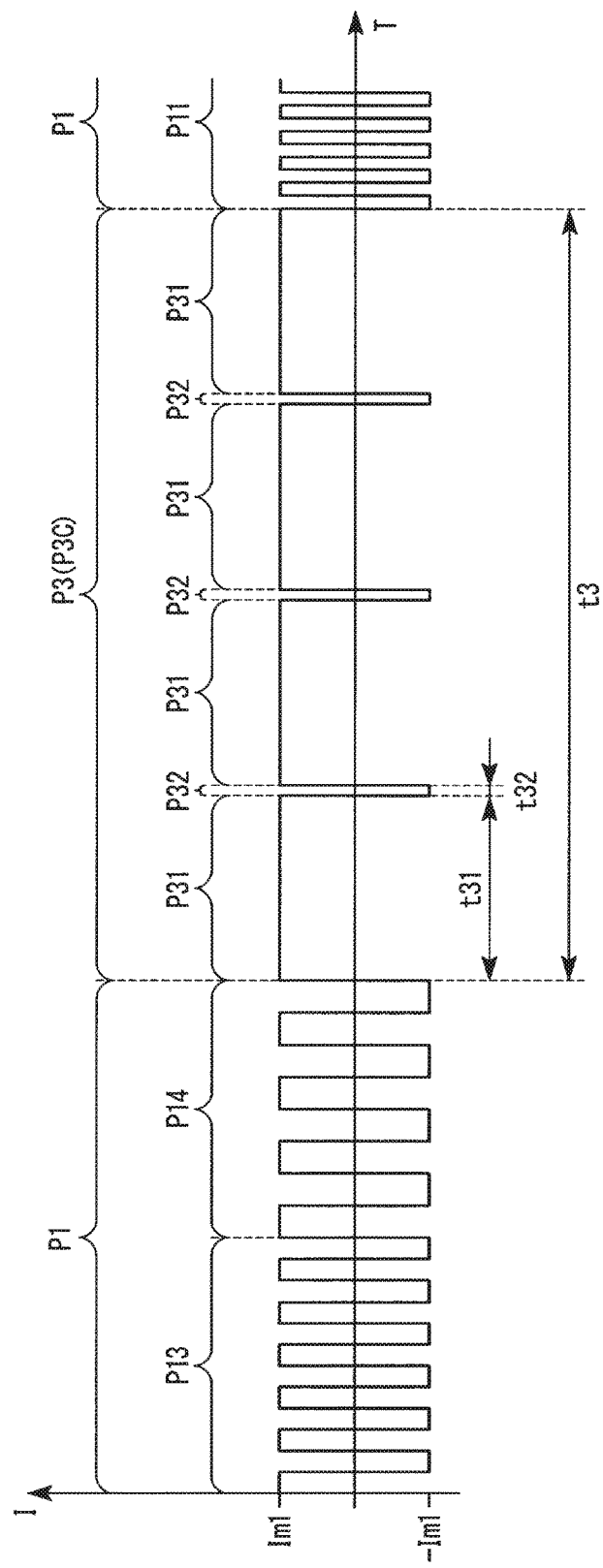
FIG. 13 shows an example of a drive current waveform of a third period in the first embodiment.

FIGS. 11 to 13 show examples of drive current waveforms in the third periods P3. In FIGS. 11 to 13, the vertical axis indicates the drive current I and the horizontal axis indicates time T. The drive current I is shown as being positive in the first polarity state and negative in the second polarity state.

As shown in FIGS. 11 to 13, the third periods P3 are periods alternately containing first direct-current periods P31 and second direct-current periods P32. The first direct-current period P31 is a period in which a direct current is supplied to the discharge lamp 90. In the examples shown in FIGS. 11 to 13, in the first direct-current period P31, the drive current I with the first polarity having the constant current value Im1 is supplied to the discharge lamp 90.

The second direct-current period P32 is a period in which a direct current having opposite polarity to the polarity of the direct current supplied to the discharge lamp 90 in the first direct-current period P31 is supplied to the discharge lamp 90. That is, in the examples shown in FIGS. 11 to 13, in the second direct-current period P32, the drive current I with the second polarity having the constant current value −Im1 is supplied to the discharge lamp 90.

The polarity of the direct current supplied to the discharge lamp 90 in the first direct-current period P31 and the polarity of the direct current supplied to the discharge lamp 90 in the second direct-current period P32 are inverted at each time when the third period P3 is provided. That is, in the third periods P3 provided next to the third periods P3 shown in FIGS. 11 to 13, the polarity of the direct current supplied to the discharge lamp 90 in the first direct-current periods P31 is the second polarity and the polarity of the direct current supplied to the discharge lamp 90 in the second direct-current periods P32 is the first polarity.

A length t31 of the first direct-current period P31 is larger than a length t32 of the second direct-current period P32. The length t31 of the first direct-current period P31 is equal to or larger than ten times the length t32 of the second direct-current period P32, for example. The length t31 of the first direct-current period P31 is set as above, and thereby, in the third period P3, while one electrode is preferably heated, excessive reduction of the temperature of the other electrode may be preferably suppressed.

The length t31 of the first direct-current period P31 is e.g. from 5.0 ms (milliseconds) to 20 ms (milliseconds). The length t32 of the second direct-current period P32 is smaller than 0.5 ms (milliseconds).

The total of the lengths t31 of the first direct-current periods P31 in the third period P3 is larger than the length t2 of the second period P2 and larger than the half cycle of the alternating current of the fourth period P4, i.e., the alternating current having the second frequency f2. The total of the lengths t31 of the first direct-current periods P31 in the third period P3 is the sum of the lengths t31 of all of the first direct-current periods P31 contained in the third period P3. In the example of FIG. 11, the third period P3 contains the two first direct-current periods P31. Accordingly, the total of the lengths t31 of the first direct-current periods P31 in the third period P3 is the sum of the lengths t31 of the two first direct-current periods P31.

The total of the lengths t31 of the first direct-current periods P31 in the third period P3 is e.g. from 10 ms (milliseconds) to 1.0 s (seconds). The total of the lengths t31 of the first direct-current periods P31 in the third period P3 is set as above, and thereby, thermal load applied to the protrusion 552*p* of the first electrode 92 may be preferably increased.

Note that, in the following description, the total of the lengths t31 of the first direct-current periods P31 in the third period P3 may be simply referred to as "the total length of the first direct-current periods P31".

The lengths t31 of the first direct-current periods P31 may be respectively the same or different from one another. In the examples in FIGS. 11 to 13, the lengths t31 of the first direct-current periods P31 may be respectively the same.

The number of first direct-current periods P31 contained in the third period P3 is determined based on e.g. the total length of the first direct-current periods P31. The number of first direct-current periods P31 is determined so that the set total length of the first direct-current periods P31 may be realized while the lengths t31 of the first direct-current periods P31 are made as large as possible within a range in which the lengths t31 of the respective first direct-current periods P31 are equal to or smaller than a predetermined value. That is, the number of first direct-current periods P31 contained in the third period P3 is larger as the total length of the first direct-current periods P31 is larger, for example.

Specifically, for example, in the case where the predetermined value is set to 10 ms (milliseconds), when the total length of the first direct-current periods P31 is larger than 10 ms (milliseconds) and equal to or smaller than 20 ms (milliseconds), the number of first direct-current periods P31 contained in the third period P3 is two. Or, when the total length of the first direct-current periods P31 is larger than 20 ms (milliseconds) and equal to or smaller than 30 ms (milliseconds), the number of first direct-current periods P31 contained in the third period P3 is three.

In the example shown in FIG. 11, the number of first direct-current periods P31 contained in the third period P3 is two. That is, for example, when the predetermined value is set to 10 ms (milliseconds), the total length of the first direct-current periods P31 is larger than 10 ms (milliseconds) and equal to or smaller than 20 ms (milliseconds).

The above-described settings are made, and thereby, the set total length of the first direct-current periods P31 may be realized while the lengths t31 of the respective first direct-current periods P31 are made equal to or less than the predetermined value (20 ms).

In the example of the embodiment, a third period P3A shown in FIG. 11 includes two first direct-current periods P31 and one second direct-current period P32. A third period P3B shown in FIG. 12 includes three first direct-current periods P31 and two second direct-current periods P32. A third period P3C shown in FIG. 13 includes four first direct-current periods P31 and three second direct-current periods P32. The length t3 of the third periods P3 are larger in the order of the third period P3A, the third period P3B, and the third period P3C.

As described above, in the embodiment, the third period P3 and the fourth period P4 are respectively provided between the mixed periods PH1 temporally adjacent to each other. In the driving cycle C2, the third period P3 and the fourth period P4 are cyclically provided according to a fixed pattern. Specifically, when the lamp voltage Vla is smaller than the first predetermined value Vla1, the control unit 40 controls the discharge lamp drive unit 230 so that one of the third period P3 and the fourth period P4 may be provided at first predetermined intervals and the fourth period P4 may be provided at second predetermined intervals larger than the first predetermined intervals. The first predetermined interval is e.g. 30 s (seconds) and the second predetermined interval is e.g. 90 s (seconds).

In the example of FIG. 10, after two third periods P3 are provided at intervals of 30 s (seconds), the fourth period P4 is provided. That is, two third periods P3 are provided from when the fourth period P4 is provided to when the next fourth period P4 is provided. The polarity of the direct current supplied to the discharge lamp 90 in the first direct-current period P31 and the polarity of the direct current supplied to the discharge lamp 90 in the second direct-current period P32 in the third period P3 are inverted at each time when the third period P3 is provided. Accordingly, in the two third periods P3 provided between the fourth periods P4 temporally adjacent to each other, the drive currents I supplied to the discharge lamp 90 are opposite in polarity to each other.

That is, in the embodiment, the control unit 40 controls the discharge lamp drive unit 230 so that two third periods P3 of the third period P3 alternatively containing the first direct-current period P31 in which the direct current having the first polarity is supplied to the discharge lamp 90 and the second direct-current period P32 in which the direct current having the second polarity is supplied to the discharge lamp 90 and the third period P3 alternatively containing the first direct-current period P31 in which the direct current having the second polarity is supplied to the discharge lamp 90 and the second direct-current period P32 in which the direct current having the first polarity is supplied to the discharge lamp 90 at the second predetermined intervals at which the fourth period P4 is provided may be provided. In other words, in the period between the fourth periods P4 temporally adjacent to each other, these two third periods P3 are provided.

Figure 14:
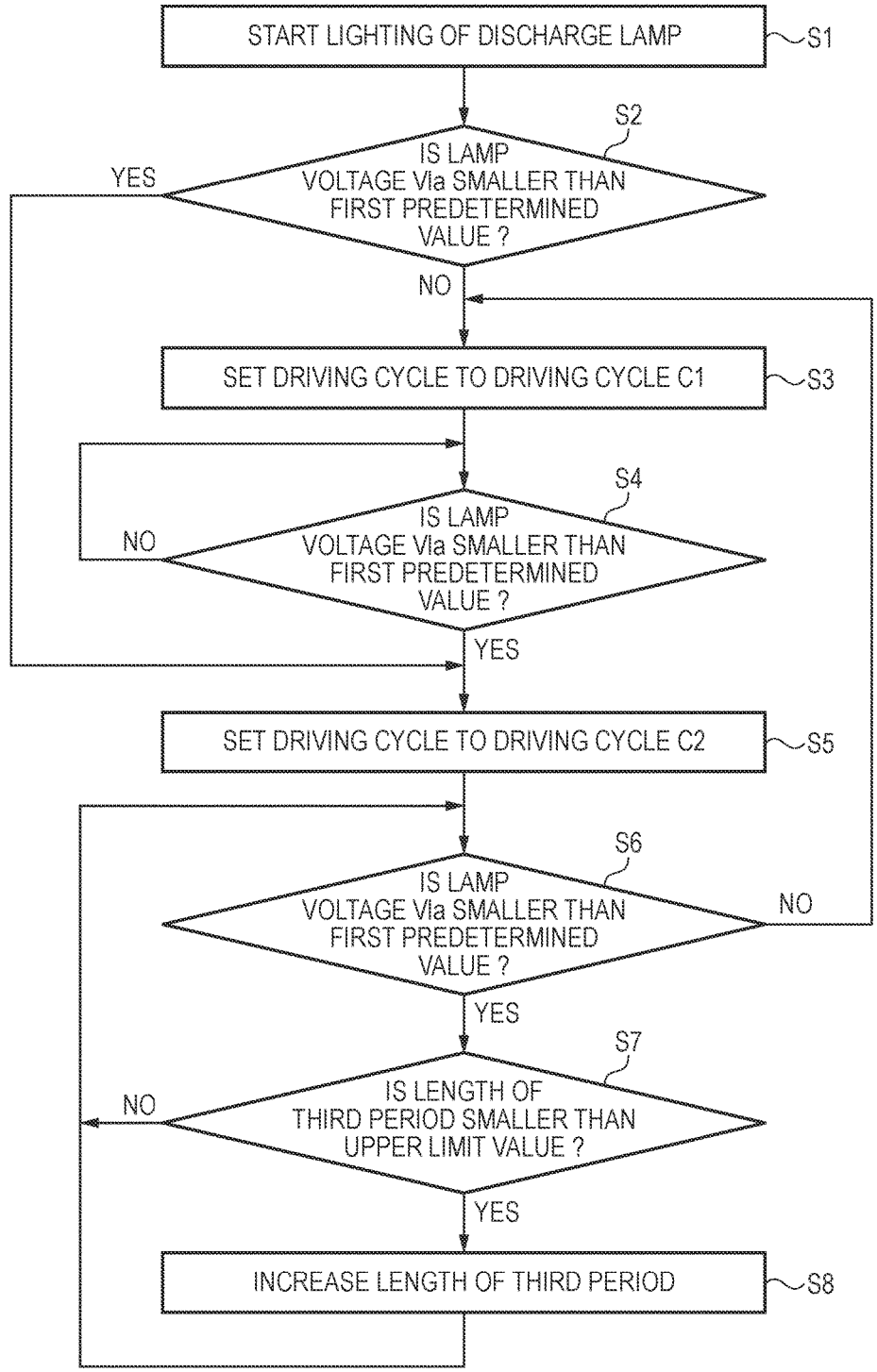
FIG. 14 is a flowchart showing an example of a control procedure of a discharge lamp drive unit by the control unit of the first embodiment.

Next, switching control between the driving cycle C1 and the driving cycle C2 by the control unit 40 of the embodiment is explained. FIG. 14 is a flowchart showing an example of the switching control between the driving cycle C1 and the driving cycle C2 by the control unit 40 of the embodiment. As shown in FIG. 14, after lighting of the discharge lamp 90 is started (step S1), the control unit 40 determines whether or not the lamp voltage Vla detected by the voltage detection part of the operation detection unit 60 is smaller than the first predetermined value Vla1 (step S2).

Here, the lamp voltage Vla used for the determination at step S2 may be e.g. the lamp voltage Vla immediately before the power of the projector 500 is previously turned OFF or the lamp voltage Vla immediately after the start of the steady lighting period in which steady lighting driving of the discharge lamp 90 is executed. The lamp voltage Vla immediately after the start of the steady lighting period may be the lamp voltage Vla detected immediately after the start of the steady lighting period or a value estimated based on the lamp voltage Vla detected in the rising period of the discharge lamp 90.

Note that the rising period refers to a period from when the lighting of the discharge lamp 90 is started to when the steady lighting driving is performed until drive power Wd rising from the start of lighting of the discharge lamp 90 toward target power becomes stable. The steady lighting period is a period in which the steady lighting driving is executed and the discharge lamp 90 is continuously lighted after the drive power Wd becomes stable.

At step S2, when the lamp voltage Vla is equal to or larger than the first predetermined value Vla1 (step S2: NO), the control unit 40 sets the driving cycle to the driving cycle C1 and executes the driving cycle C1 (step S3). Then, the control unit 40 determines whether or not the lamp voltage Vla is smaller than the first predetermined value Vla1 during execution of the driving cycle C1 (step S4). Here, in the embodiment, the detection of the lamp voltage Vla during the execution of the driving cycle C1 is performed in the fourth period P4. That is, the voltage detection part detects the lamp voltage Vla in the fourth period P4.

If the lamp voltage Vla is equal to or larger than the first predetermined value Vla1 during the execution of the driving cycle C1 (step S4: NO), the control unit 40 continues to execute the driving cycle C1. On the other hand, when the lamp voltage Vla is smaller than the first predetermined value Vla1 during the execution of the driving cycle C1 (step S4: YES), the control unit 40 sets the driving cycle to the driving cycle C2 and executes the driving cycle (step S5).

On the other hand, when the lamp voltage Vla is smaller than the first predetermined value Vla1 at step S2 (step S2: YES), the control unit 40 sets the driving cycle to the driving cycle C2 and executes the driving cycle (step S5). As described above, when the lamp voltage Vla is smaller than the first predetermined value Vla1, the control unit 40 executes the driving cycle C2. In other words, when the lamp voltage Vla is smaller than the first predetermined value Vla1, the control unit 40 controls the discharge lamp drive unit 230 so that the mixed period PH1, the third period P3, and the fourth period P4 may be provided.

The control unit 40 determines whether or not the lamp voltage Vla is smaller than the first predetermined value Vla1 during execution of the driving cycle C2 (step S6). Here, in the embodiment, the detection of the lamp voltage Vla during the execution of the driving cycle C2 is performed in the fourth period P4 as is the case during the execution of the driving cycle C1.

If the lamp voltage Vla is equal to or larger than the first predetermined value Vla1 during the execution of the driving cycle C2 (step S6: NO), the control unit 40 returns the driving cycle to the driving cycle C1 (step S3). That is, when the lamp voltage Vla is equal to or larger than the first predetermined value Vla1, the control unit 40 controls the discharge lamp drive unit 230 so that the third period P3 may not be provided. On the other hand, when the lamp voltage Vla is smaller than the first predetermined value Vla1 during the execution of the driving cycle C2 (step S6: YES), the control unit 40 determines whether or not the length t3 of the third period P3 is smaller than an upper limit value (step S7). Here, the upper limit value of the length t3 of the third period P3 is e.g. 200 ms (milliseconds).

If the length t3 of the third period P3 is smaller than the upper limit value (step S7: YES), the control unit 40 increases the length t3 of the third period P3 (step S8). Specifically, for example, when the third period P3 is the third period P3A shown in FIG. 11, the control unit 40 sets the third period P3 to the third period P3B shown in FIG. 12. When the third period P3 is the third period P3B shown in FIG. 12, the control unit 40 sets the third period P3 to the third period P3C shown in FIG. 13. Thereby, the control unit 40 increases the length t3 of the third period P3.

After increasing the length t3 of the third period P3, the control unit 40 determines whether or not the lamp voltage Vla is smaller than the first predetermined value Vla1 again (step S6), and, when the lamp voltage Vla is smaller than the first predetermined value Vla1 (step S6: YES) and the length t3 of the third period P3 is smaller than the upper limit value (step S7: YES), increases the length t3 of the third period P3 again. In the above-described manner, when the lamp voltage Vla is smaller than the first predetermined value Vla1, the control unit 40 increases the length t3 of the third period P3 in a stepwise manner.

As an example, the length t2 of the second period P2 is 10 ms (milliseconds). The length t3 of the third period P3A is 20 ms (milliseconds). The length t3 of the third period P3B is 30 ms (milliseconds). The length t3 of the third period P3C is 40 ms (milliseconds). That is, in consideration of the second period P2 of the driving cycle C1 corresponding to the part in which the third period P3 is provided in the driving cycle C2 and the period of the third period P3 of the driving cycle C2 together, when the lamp voltage Vla is smaller than the first predetermined value Vla1, the control unit 40 increases the length of the period by 10 ms (milliseconds) each time. Then, when the lamp voltage Vla is equal to or larger than the first predetermined value Vla1, the control unit 40 returns the length of the period to 10 ms (milliseconds).

Figure 15:
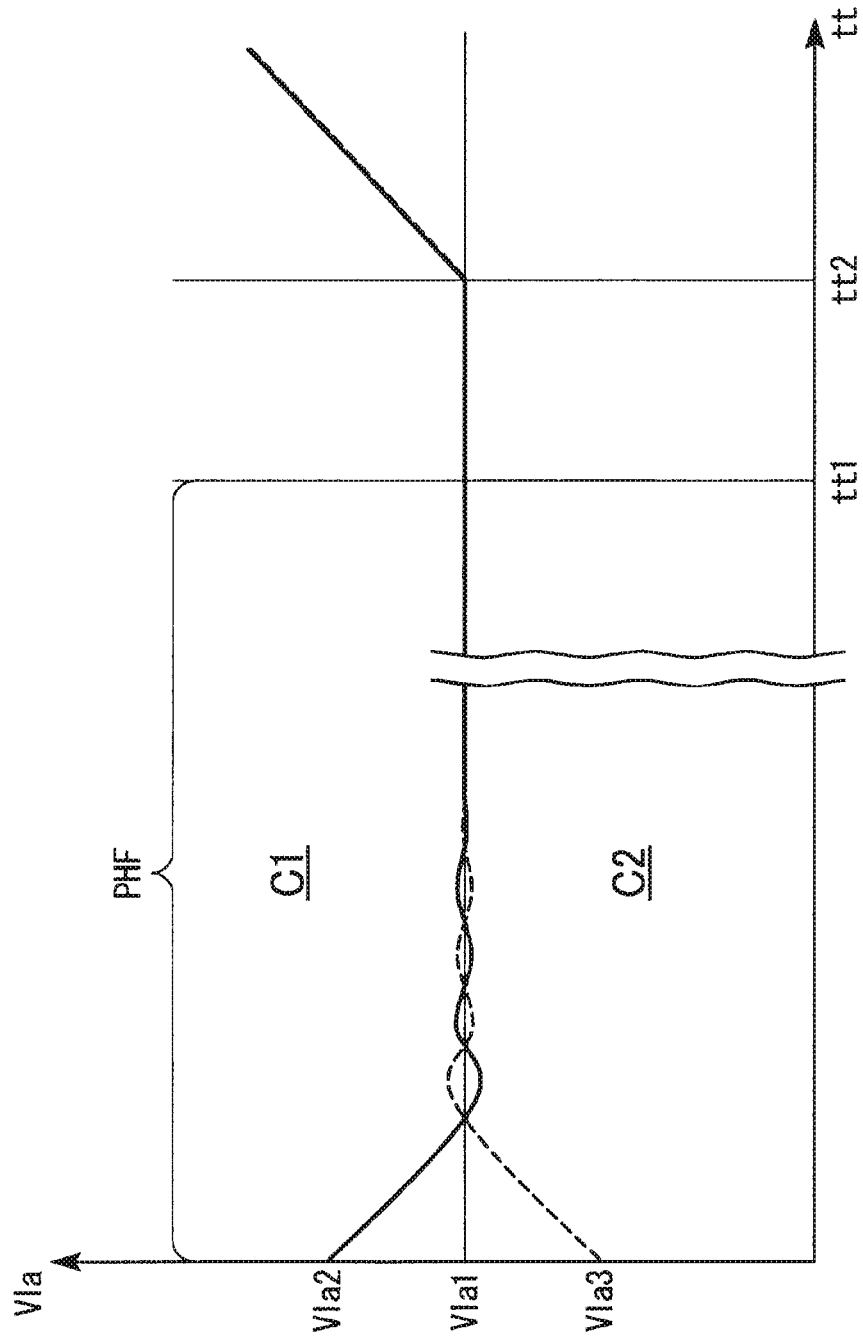
FIG. 15 is a graph showing changes of a lamp voltage in the first embodiment.

FIG. 15 is a graph showing changes of the lamp voltage Vla with respect to an accumulated lighting time tt. In FIG. 15, the vertical axis indicates the lamp voltage Vla and the horizontal axis indicates the accumulated lighting time tt. The accumulated lighting time tt is a total of the times in which the discharge lamp 90 is lighted. That is, the accumulated lighting time tt is a time accumulated from when the discharge lamp 90 is first lighted.

In the embodiment, the above-described switching control between the driving cycle C1 and the driving cycle C2 is performed in an initial period PHF in which the accumulated lighting time tt shown in FIG. 15 is equal to or smaller than a second predetermined value tt1. That is, in the embodiment, when the lamp voltage Vla is smaller than the first predetermined value Vla1 and the accumulated lighting time tt of the discharge lamp 90 is equal to or smaller than the second predetermined value tt1, the control unit 40 increases the length t3 of the third period P3 in a stepwise manner.

The second predetermined value tt1 is e.g. from 20 h (hours) to 100 h (hours). The second predetermined value tt1 is smaller than a third predetermined value tt2. The third predetermined value tt2 is the accumulated lighting time tt when the lamp voltage Vla starts to deteriorate and the lamp voltage Vla rises.

Further, in the embodiment, the above-described switching control between the driving cycle C1 and the driving cycle C2 is executed in the steady lighting period in which the steady lighting driving is executed. That is, the control unit 40 increases the length t3 of the third period P3 in a stepwise manner when the lamp voltage Vla is smaller than the first predetermined value Vla1 in the steady lighting period in which the steady lighting driving is executed.

The discharge lamp lighter 10 including the control unit 40 that performs the above-described control may be represented as a method of driving a discharge lamp. That is, an aspect of the method of driving a discharge lamp of the embodiment is a method of driving a discharge lamp including supplying the drive current I to the discharge lamp 90 having the first electrode 92 and the second electrode 93 and driving the discharge lamp 90, and, when the lamp voltage Vla is smaller than the first predetermined value Vla1, supplying the drive current I containing the mixed period PH1 in which the first period P1 with the alternating current supplied to the discharge lamp 90 and the second period P2 with the direct current supplied to the discharge lamp 90 are alternately repeated and the third period P3 alternately including the first direct-current period P31 with the first electrode 92 serving as the anode and the second direct-current period P32 with the second electrode 93 serving as the anode to the discharge lamp 90, in which the length t31 of the first direct-current period P31 is longer than the length t32 of the second direct-current period P32, with the length of the second direct-current period P32 being smaller than 0.5 ms and the total of the lengths t31 of the first direct-current periods P31 in the third period P3 being larger than the length t2 of the second period P2, and, when the lamp voltage Vla is smaller than the first predetermined value Vla1, increasing the length t31 of the third period P3 in a stepwise manner.

According to the embodiment, when the lamp voltage Vla is smaller than the first predetermined value Vla1, the third period P3 is provided in addition to the mixed period PH1 in which the first period P1 with the alternating current supplied to the discharge lamp 90 and the second period P2 with the direct current supplied to the discharge lamp 90 are alternately repeated. In the third period P3, the first direct-current period P31 and the second direct-current period P32 are provided. The length t31 of the first direct-current period P31 is larger than the length t32 of the second direct-current period P32, and the length t32 of the second direct-current period P32 is smaller than 0.5 ms (milliseconds). Accordingly, in the third period P3, the electrode on the side as the anode may be heated in the first direct-current period P31. Note that, in the following description, the explanation will be made on the assumption that the electrode on the heated side is e.g. the first electrode 92.

Further, the total length of the first direct-current periods P31 is larger than the length t2 of the second period P2. Accordingly, the thermal load applied to the first electrode 92 heated in the third period P3 is larger than the thermal load applied to the first electrode 92 heated in the second period P2.

As described above, in the third period P3, compared to the first period P1 or second period P2, the thermal load applied to the first electrode 92 is larger. Accordingly, when the protrusion 552p of the first electrode 92 grows, the distance between electrodes becomes smaller, and the lamp voltage Vla becomes lower, the degree of melting of the protrusion 552p of the first electrode 92 may be raised. Thereby, the protrusion 552p may be melted and excessive reduction of the distance between electrodes of the discharge lamp 90 may be suppressed. Therefore, in the initial state of the discharge lamp 90 with relatively little deterioration, reduction of the brightness of the discharge lamp 90 may be suppressed and production of a mercury bridge may be suppressed.

For example, the first electrode 92 of the discharge lamp 90 may vary and, even when the same thermal load is applied thereto, the degree of growth of the protrusion 552p of the first electrode 92 may vary with respect to each discharge lamp 90. Thereby, for example, when the length t3 of the third period P3 is fixed, it may be impossible to sufficiently melt the protrusion 552p in the third period P3 depending on the discharge lamp 90. Therefore, it may be impossible to sufficiently suppress the reduction of the distance between electrodes and the condition that the lamp voltage Vla is smaller than the first predetermined value Vla1 may be maintained. In this case, the lamp voltage Vla maintained in the initial state of the discharge lamp 90 may vary depending on the discharge lamp 90. When the lamp voltage Vla varies, a problem that the brightness of the projector 500 on which the discharge lamp 90 is mounted varies arises.

On the other hand, according to the embodiment, when the lamp voltage Vla is smaller than the first predetermined value Vla1, the control unit 40 increases the length t3 of the third period P3 in the stepwise manner. Accordingly, when the lamp voltage Vla is smaller than the first predetermined value Vla1, the thermal load applied to the first electrode 92 by the third period P3 until the lamp voltage Vla becomes equal to or larger than the first predetermined value Vla1 may be made larger. Thereby, even when the discharge lamp 90 varies, appropriate thermal load may be applied with respect to each discharge lamp 90 by the third period P3, and the lamp voltage Vla can be maintained at the first predetermined value Vla1.

More specifically, as shown in FIG. 15, in the case where the initial lamp voltage Vla of the discharge lamp 90 is Vla2 larger than the first predetermined value Vla1, when the discharge lamp 90 is first lighted, the driving cycle C1 is executed as the driving cycle. In this case, as shown by a solid line in FIG. 15, for example, the lamp voltage Vla gradually decreases and becomes smaller than the first predetermined value Vla1. Then, when the lamp voltage Vla is smaller than the first predetermined value Vla1, the driving cycle is switched to the driving cycle C2 and the third period P3 is provided. The control unit 40 increases the length t3 of the third period P3 in the stepwise manner in the driving cycle C2. Accordingly, the length t3 of the third period P3 may be made to be the length that may apply optimal thermal load independent of the variations of the discharge lamp 90, and the lamp voltage Vla may be made larger. Then, when the lamp voltage Vla is equal to or larger than the first predetermined value Vla1, the driving cycle is switched to the driving cycle C1 again, and the lamp voltage Vla starts to gradually decrease again. Such a behavior is repeated, and thereby, the lamp voltage Vla is maintained at the first predetermined value Vla1.

In the case where the initial lamp voltage Vla of the discharge lamp 90 is Vla3 smaller than the first predetermined value Vla1, when the discharge lamp 90 is first lighted, the driving cycle C2 is executed as the driving cycle. In this case, the third period P3 is provided and the length t3 of the third period P3 is increased in the stepwise manner, and thereby, the lamp voltage Vla rises as shown by a broken line in FIG. 15 independent of the variations of the discharge lamp 90. Then, when the lamp voltage Vla becomes equal to or larger than the first predetermined value Vla1, the driving cycle is switched to the driving cycle C1, and the lamp voltage Vla starts to gradually decrease. Such a behavior is repeated, and thereby, the lamp voltage Vla is maintained at the first predetermined value Vla1.

In the above-described manner, the lamp voltage Vla in the initial state may be maintained at the first predetermined value Vla1 independent of the variations of the discharge lamp 90. Therefore, the brightness of the projector 500 may be stably maintained to be predetermined brightness independent of the variations of the discharge lamp 90.

Further, for example, the case where the initial lamp voltage Vla of the discharge lamp 90 is equal to or larger than the first predetermined value Vla1 and, after the discharge lamp 90 is first lighted, the lamp voltage Vla gradually rises is considered. In this case, the lamp voltage Vla does not become smaller than the first predetermined value Vla1 and it may be impossible to maintain the lamp voltage Vla at the first predetermined value Vla1. For example, in the driving cycle C1 executed when the lamp voltage Vla is equal to or larger than the first predetermined value Vla1, when the thermal load applied to the first electrode 92 is excessively large, the protrusion 552p of the first electrode 92 may excessively melt, the distance between electrodes may be larger, and the lamp voltage Vla may rise.

On the other hand, according to the embodiment, when the lamp voltage Vla is equal to or larger than the first predetermined value Vla1, the control unit 40 controls the discharge lamp drive unit 230 so that the third period P3 may not be provided. Accordingly, when the lamp voltage Vla is equal to or larger than the first predetermined value Vla1, preferable reduction of the thermal load applied to the first electrode 92 by the driving cycle C1 may be easier. Thereby, when the driving cycle C1 in the initial state of the discharge lamp 90 is executed, the protrusion 552p may be grown and the lamp voltage Vla may be gradually reduced. Therefore, when the initial lamp voltage Vla of the discharge lamp 90 is equal to or larger than the first predetermined value Vla1, the rise of the lamp voltage Vla from the initial state may be suppressed and the lamp voltage Vla may be maintained at the first predetermined value Vla1.

Further, according to the embodiment, the above-described switching control between the driving cycles is performed in the initial period PHF in which the accumulated lighting time tt is equal to or smaller than the second predetermined value tt1. Accordingly, in the initial state of the discharge lamp 90 in which the distance between electrodes of the discharge lamp 90 is likely to be smaller, the above-described switching control is performed, and thereby, excessive reduction of the distance between electrodes may be preferably suppressed. In the embodiment, the second predetermined value tt1 is smaller than the third predetermined value tt2 as the accumulated lighting time tt when the lamp voltage Vla starts to deteriorate and the lamp voltage Vla starts to rise. Accordingly, before the start of deterioration of the discharge lamp 90 and the rise of the lamp voltage Vla, the control of the discharge lamp drive unit 230 can be switched to other appropriate control. Thereby, the life of the discharge lamp 90 may be improved.

According to the embodiment, during the execution of the driving cycle C1 and during the execution of the driving cycle C2, the lamp voltage Vla is detected in the fourth period P4. The fourth period P4 is the period in which the alternating current having the second frequency f2 smaller than the first frequency f1 of the alternating current supplied to the discharge lamp 90 in the first period P1 is supplied to the discharge lamp 90. Accordingly, in the fourth period P4, the respective times in which the first polarity and the second polarity are maintained are relatively long. Thereby, the stable conditions of the respective electrodes may be easily obtained and the preferable detection of the lamp voltage Vla may be easier.

According to the embodiment, when the lamp voltage Vla is smaller than the first predetermined value Vla1, one of the third period P3 and the fourth period P4 is provided at the first predetermined intervals and the fourth period P4 is provided at the second predetermined intervals larger than the first predetermined intervals. Accordingly, the third period P3 is provided between the fourth periods P4 temporally adjacent to each other. Thereby, when the lamp voltage Vla is detected in the fourth period P4 in the driving cycle C2, at least one or more third periods P3 may be provided from when the lamp voltage Vla is detected to when the lamp voltage Vla is next detected. Therefore, after the thermal load is applied to the first electrode 92 by the at least one or more third periods P3, the determination of switching between the driving cycles may be performed. As a result, appropriate switching between the driving cycles may be easily performed.

According to the embodiment, the switching control between the driving cycles is executed in the steady lighting period. Accordingly, the drive power Wd becomes stable and the driving cycles may be switched in the stable condition of the first electrode 92.

Note that, in the embodiment, the following configurations and methods may be employed.

In the embodiment, the driving cycle C1 is not particularly limited. The driving cycle C1 may not have any one or more of the first period P1, the second period P2, and the fourth period P4 or may have another period than the first period P1, the second period P2, or the fourth period P4.

Further, in the embodiment, the driving cycle C2 is not particularly limited as long as the cycle has the mixed period PH1 and the third period P3. The driving cycle C2 may not have the fourth period P4 or have another period than the first period P1 to the fourth period P4. The first period P1, the second period P2, the third period P3, and the fourth period P4 may be provided in any form within the driving cycle C2. For example, in the above description, regarding the first period P1 and the second period P2, only the case where the periods are alternately continuously provided in the mixed period PH1 is explained, however, the respective periods may be separately provided, not limited to that. Or, for example, the second period P2 and third period P3, the second period P2 and fourth period P4, and the third period P3 and fourth period P4 are respectively continuously provided.

In the embodiment, the third period P3 and fourth period P4 provided between the mixed periods PH1 temporally adjacent to each other may be provided immediately after the second period P2.

In the embodiment, the switching control between the driving cycles may be executed in another period than the initial period PHF. Further, for example, the control unit 40 may determine whether or not to execute the switching control between the driving cycles based on the lamp voltage Vla.

The detection of the lamp voltage Vla in the driving cycles C1, C2 may be performed in another period than the fourth period P4. The detection of the lamp voltage Vla in the driving cycles C1, C2 may be constantly performed during execution of the respective driving cycles.

In the embodiment, the method of increasing the length t3 of the third period P3 in the stepwise manner is not particularly limited. In the above-described example, at each time when the length t3 of the third period P3 is increased, the number of first direct-current periods P31 and the number of second direct-current periods P32 are increased one by one, however, not limited to that. The control unit 40 may increase the length t3 of the third period P3 by increasing the lengths t31 of the first direct-current periods P31, for example.

The amount of increase of the length t3 of the third period P3 is not necessarily constant, but may be different at each time when the length t3 of the third period P3 is increased. Or, the amount of increase of the length t3 of the third period P3 may be changed according to the change of the lamp voltage Vla during execution of the driving cycle C2. That is, for example, in the case where the lamp voltage Vla is harder to rise even when the length t3 of the third period P3 is increased, the control unit 40 may increase the amount of increase of the length t3 of the third period P3 when next increasing the length t3 of the third period P3. Further, the lengths t31 of the plurality of first direct-current periods P31 contained in the third period P3 may be different from one another.

In the embodiment, the plurality of first frequencies f1 may be provided in any form. In the embodiment, for example, in the first period P1, the alternating-current period provided later may have the larger first frequency f1.

In the embodiment, the first frequency f1 may include only one frequency. That is, in the embodiment, only one type of the alternating-current period may be provided in the first period P1.

In the embodiment, the lengths of the respective alternating-current periods contained in the first period P1 may be different from one another. That is, the length t11 of the first alternating-current period P11, the length t12 of the second alternating-current period P12, the length t13 of the third alternating-current period P13, and the length t14 of the fourth alternating-current period P14 may be different from one another.

Further, in the above description, end polarity of a certain period and start polarity of a period provided immediately after the certain period are different from each other, however, not limited to that. In the embodiment, end polarity of a certain period and start polarity of a period provided immediately after the certain period may be the same.

In the embodiment, it is not necessary that the control unit 40 inverts the polarity of the direct current supplied to the discharge lamp 90 in the second period P2 of the mixed period PH1 at each time when the second period P2 is provided. That is, in the embodiment, two or more second periods P2 in which the direct currents having the same polarity are supplied to the discharge lamp 90 may be continuously provided.

In the embodiment, it is not necessary that the control unit 40 inverts the polarity of the direct current supplied to the discharge lamp 90 in the first direct-current period P31 and the polarity of the direct current supplied to the discharge lamp 90 in the second direct-current period P32 at each time when the third period P3 is provided. That is, in the embodiment, two or more third periods P3 in which the polarity of the direct current supplied to the discharge lamp 90 in the first direct-current period P31 and the polarity of the direct current supplied to the discharge lamp 90 in the second direct-current period P32 are respectively the same may be continuously provided.

In the embodiment, after increasing the length t3 of the third period P3 in the driving cycle C2, when the lamp voltage Vla is equal to or larger than the first predetermined value Vla1, the control unit 40 returns the driving cycle from the driving cycle C2 to the driving cycle C1, however, not limited to that. After increasing the length t3 of the third period P3 in the driving cycle C2, when the lamp voltage Vla becomes equal to or larger than a fourth predetermined value Vla4 (second voltage) larger than the first predetermined value Vla1 (first voltage), the control unit 40 may return the driving cycle from the driving cycle C2 to the driving cycle C1. Thereby, the control unit 40 executes the driving cycle C2 containing the third period P3 and the processing of increasing the length t3 of the third period P3 until the lamp voltage Vla becomes equal to or larger than the fourth predetermined value Vla4 larger than the first predetermined value Vla1, and thereby, may increase the lamp voltage Vla more reliably. That is, regarding the discharge lamp 90, the lamp voltage Vla may be made harder to decrease from the first predetermined value Vla1.

Second Embodiment

The second embodiment is different from the first embodiment in that the driving cycle is not switched in the initial period PHF, but the driving cycle C2 is constantly executed. That is, in the embodiment, the control unit 40 controls the discharge lamp drive unit 230 so that the mixed period PH1, the third period P3, and the fourth period P4 may be provided even when the lamp voltage Vla is equal to or larger than the first predetermined value Vla1. In the embodiment, the third period P3 when the lamp voltage Vla is equal to or larger than the first predetermined value Vla1 is e.g. the third period P3A shown in FIG. 11. In the following description, the length t3 of the third period P3A is referred to as "first length". That is, in the embodiment, the length t3 of the third period P3 when the lamp voltage Vla is equal to or larger than the first predetermined value Vla1 is the first length.

Figure 16:
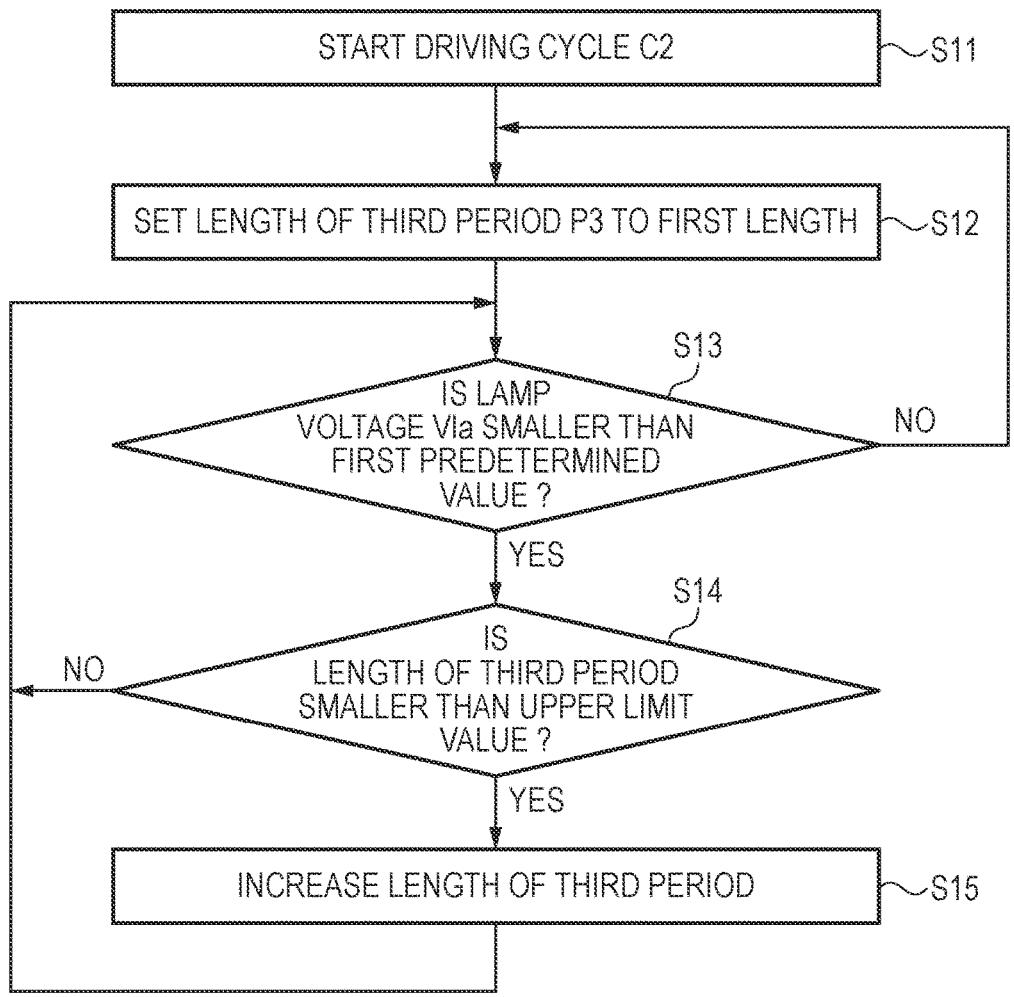
FIG. 16 is a flowchart showing an example of a control procedure of a discharge lamp drive unit by a control unit of the second embodiment.

FIG. 16 is a flowchart showing an example of control by the control unit 40 in the embodiment. As shown in FIG. 16, in the embodiment, if the driving cycle C2 is started (step S11), the control unit 40 sets the length t3 of the third period P3 to the first length (step S12). In other words, the control unit 40 sets the third period P3 to the third period P3A.

Then, the control unit 40 determines whether or not the lamp voltage Vla is smaller than the first predetermined value Vla1 (step S13). when the lamp voltage Vla is equal to or larger than the first predetermined value Vla1 (step S13: NO), the control unit 40 continues to execute the driving cycle C2 with the length t3 of the third period P3 fixed to the first length. On the other hand, when the lamp voltage Vla is smaller than the first predetermined value Vla1 (step S13: YES), the control unit 40 determines whether or not the length t3 of the third period P3 is smaller than an upper limit value (step S14). When the length t3 of the third period P3 is set to the first length, the length t3 of the third period P3 is smaller than the upper limit value (step S14: YES), and the control unit 40 increases the length t3 of the third period P3 (step S15). Specifically, for example, the control unit 40 sets the third period P3 to the third period P3B shown in FIG. 12.

After increasing the length t3 of the third period P3, the control unit 40 determines whether or not the lamp voltage Vla is smaller than the first predetermined value Vla1 again (step S13), and, when the lamp voltage Vla is smaller than the first predetermined value Vla1 (step S13: YES) and the length t3 of the third period P3 is smaller than the upper limit value (step S14: YES), increases the length t3 of the third period P3 again (step S15). In the above-described manner, when the lamp voltage Vla is smaller than the first predetermined value Vla1, the control unit 40 increases the length t3 of the third period P3 from the first length in a stepwise manner.

After increasing the length t3 of the third period P3 when the lamp voltage Vla is smaller than the first predetermined value Vla1, when the lamp voltage Vla becomes equal to or larger than the first predetermined value Vla1 (step S13: NO), the control unit 40 returns the length t3 of the third period P3 to the first length (step S12).

According to the embodiment, as is the case of the first embodiment, excessive reduction of the distance between electrodes of the discharge lamp 90 may be suppressed. Further, the lamp voltage Vla in the initial state may be maintained at the first predetermined value Vla1 independent of the variations of the discharge lamp 90. Further, according to the embodiment, switching between the driving cycles is unnecessary, and thereby, the control may be simplified.

Note that, in the embodiment, the length t3 of the third period P3 when the lamp voltage Vla is equal to or larger than the first predetermined value Vla1, i.e., the first length may be determined based on the drive power Wd. For example, when the drive power Wd is relatively small, the first length may be made relatively large, and, when the drive power Wd is relatively large, the first length may be made relatively small.

In the embodiment, after increasing the length t3 of the third period P3 when the lamp voltage Vla is smaller than the first predetermined value Vla1, when the lamp voltage Vla is equal to or larger than the first predetermined value Vla1, the control unit 40 returns the length t3 of the third period P3 to the first length, however, not limited to that. As is the case of the first embodiment, after increasing the length t3 of the third period P3 when the lamp voltage Vla is smaller than the first predetermined value Vla1, when the lamp voltage Vla becomes equal to or larger than the fourth predetermined value Vla4 (second voltage) larger than the first predetermined value Vla1 (first voltage), the control unit 40 may return the length t3 of the third period P3 to the first length. Thereby, as is the case of the first embodiment, regarding the discharge lamp 90, the lamp voltage Vla may be made harder to decrease from the first predetermined value Vla1.

Note that, in the above-described respective embodiments, the examples of the case where the invention is applied to a transmissive-type projector are explained, however, the invention can be applied to a reflective-type projector. Here, "transmissive-type" refers to a type with a liquid crystal light valve including a liquid crystal panel that transmits light. "Reflective-type" refers to a type with a liquid crystal light valve that reflects light. The light modulator is not limited to the liquid crystal panel, but may be a light modulator using e.g. a micromirror.

Further, in the above-described respective embodiments, the examples of the projector 500 using the three liquid crystal panels 560R, 560G, 560B (liquid crystal light valves 330R, 330G, 330B) are taken, however, the invention can be applied to a projector using only one liquid crystal panel or a projector using four or more liquid crystal panels.

Furthermore, the above-described respective configurations may be appropriately combined within a range consistent with one another.

The entire disclosure of Japanese Patent Application No. 2016-215974, filed Nov. 4, 2016 is expressly incorporated by reference herein.

What is claimed is:

1. A discharge lamp driver comprising:
a discharge lamp drive unit configured to supply drive current to a discharge lamp having a first electrode and a second electrode;
a control unit configured to control the discharge lamp drive unit; and
a voltage detection part configured to detect an inter-electrode voltage of the discharge lamp,
wherein, when the inter-electrode voltage is smaller than a first predetermined value, the control unit is configured to control the discharge lamp drive unit to provide
a mixed period in which a first period in which alternating current is supplied and a second period in which direct current is supplied are alternately repeated and
a third period alternately including a first direct-current period in which a direct current is supplied and a second direct-current period in which a direct current having opposite polarity to polarity of the direct current supplied in the first direct-current period is supplied, the third period in which a length of the first direct-current period is larger than a length of the second direct-current period,
wherein the length of the second direct-current period is smaller than 0.5 ms,
wherein a total of the lengths of the first direct-current periods in the third period is larger than a length of the second period, and
wherein when the inter-electrode voltage is smaller than the first predetermined value, the control unit is configured to increase the length of the third period in a stepwise manner.

2. The discharge lamp driver according to claim 1, wherein the control unit controls the discharge lamp drive unit not to provide the third period when the inter-electrode voltage is equal to or larger than the first predetermined value.

3. A projector comprising:
a discharge lamp configured to emit light;
the discharge lamp driver according to claim 2;
a light modulator configured to modulate the light emitted from the discharge lamp according to an image signal; and
a projection system configured to project the light modulated by the light modulator.

4. The discharge lamp driver according to claim 1,
wherein the control unit controls the discharge lamp drive unit to provide the mixed period and the third period when the inter-electrode voltage is equal to or larger than the first predetermined value,
wherein the length of the third period when the inter-electrode voltage is equal to or larger than the first predetermined value is a first length,
wherein the control unit increases the length of the third period from the first length in a stepwise manner when the inter-electrode voltage is smaller than the first predetermined value, and
wherein after increasing the length of the third period when the inter-electrode voltage is smaller than the first predetermined value, when the inter-electrode voltage becomes equal to or larger than the first predetermined value, the control unit returns the length of the third period to the first length.

5. A projector comprising:
a discharge lamp configured to emit light;
the discharge lamp driver according to claim 3;
a light modulator configured to modulate the light emitted from the discharge lamp according to an image signal; and
a projection system configured to project the light modulated by the light modulator.

6. The discharge lamp driver according to claim 1, wherein the control unit increases the length of the third period in a stepwise manner when the inter-electrode voltage is smaller than the first predetermined value and an accumulated lighting time of the discharge lamp is equal to or smaller than a second predetermined value.

7. A projector comprising:
a discharge lamp configured to emit light;
the discharge lamp driver according to claim 4;
a light modulator configured to modulate the light emitted from the discharge lamp according to an image signal; and
a projection system configured to project the light modulated by the light modulator.

8. The discharge lamp driver according to claim 1,
wherein the control unit controls the discharge lamp drive unit to provide a fourth period in which an alternating current having a second frequency smaller than a first frequency of the alternating current supplied in the first period is supplied to the discharge lamp,
wherein a total of the lengths of the first direct-current periods in the third period is larger than a length of a half cycle of the alternating current having the second frequency, and
wherein the voltage detection part detects the inter-electrode voltage in the fourth period.

9. The discharge lamp driver according to claim 8,
wherein a plurality of the mixed periods are provided,
wherein the third period and the fourth period are respectively provided between the mixed periods adjacent to each other and provided immediately after the first period, and
wherein when the inter-electrode voltage is smaller than the first predetermined value, the control unit controls the discharge lamp drive unit to provide one of the third period and the fourth period at first predetermined intervals, and controls the discharge lamp drive unit to provide the fourth period at second predetermined intervals larger than the first predetermined intervals.

10. A projector comprising:
a discharge lamp configured to emit light;
the discharge lamp driver according to claim 6;
a light modulator configured to modulate the light emitted from the discharge lamp according to an image signal; and
a projection system configured to project the light modulated by the light modulator.

11. A projector comprising:
a discharge lamp configured to emit light;
the discharge lamp driver according to claim 5;
a light modulator configured to modulate the light emitted from the discharge lamp according to an image signal; and
a projection system configured to project the light modulated by the light modulator.

12. The discharge lamp driver according to claim 1, wherein the control unit increases the length of the third period in a stepwise manner when the inter-electrode voltage is smaller than the first predetermined value in a steady lighting period in which steady lighting driving is executed.

13. A projector comprising:

a discharge lamp configured to emit light;

the discharge lamp driver according to claim 7;

a light modulator configured to modulate the light emitted from the discharge lamp according to an image signal; and a projection system configured to project the light modulated by the light modulator.

14. A projector comprising:

a discharge lamp configured to emit light;

the discharge lamp driver according to claim 1;

a light modulator configured to modulate the light emitted from the discharge lamp according to an image signal; and a projection system configured to project the light modulated by the light modulator.

15. A method of driving a discharge lamp for supplying drive current to a discharge lamp and driving the discharge lamp having a first electrode and a second electrode, the method comprising:

detecting an inter-electrode voltage of the discharge lamp;

supplying, when the inter-electrode voltage is smaller than a first predetermined value, the drive current containing a mixed period in which a first period in which an alternating current is supplied and a second period in which a direct current is supplied are alternately repeated and a third period alternately including a first direct-current period in which a direct current is supplied and a second direct-current period in which a direct current having opposite polarity to polarity of the direct current supplied in the first direct-current period, the third period in which a length of the first direct-current period is larger than a length of the second direct-current period, the length of the second direct-current period being smaller than 0.5 ms, and a total of lengths of the first direct-current periods in the third period being larger than a length of the second period; and increasing, when the inter-electrode voltage is smaller than the first predetermined value, the length of the third period in a stepwise manner.

* * * * *